US007045479B2

(12) United States Patent
Zhou et al.

(10) Patent No.: US 7,045,479 B2
(45) Date of Patent: May 16, 2006

(54) INTERMEDIATE PRECURSOR COMPOSITIONS USED TO MAKE SUPPORTED CATALYSTS HAVING A CONTROLLED COORDINATION STRUCTURE AND METHODS FOR PREPARING SUCH COMPOSITIONS

(75) Inventors: Bing Zhou, Cranbury, NJ (US); Michael Rueter, Plymouth Meeting, PA (US)

(73) Assignee: Headwaters Nanokinetix, Inc., Lawrenceville, NJ (US)

( * ) Notice: Subject to any disclaimer, the term of this patent is extended or adjusted under 35 U.S.C. 154(b) by 74 days.

(21) Appl. No.: 10/618,909

(22) Filed: Jul. 14, 2003

(65) Prior Publication Data

US 2005/0014636 A1    Jan. 20, 2005

(51) Int. Cl.
*B01J 31/00*    (2006.01)
*B01J 37/00*    (2006.01)

(52) U.S. Cl. .................. 502/125; 502/123; 502/103; 502/104; 502/302; 502/306; 502/308; 502/313; 502/314; 502/325; 502/326

(58) Field of Classification Search ................ 502/103, 502/104, 125, 302, 306, 308, 313, 314, 325, 502/326, 123
See application file for complete search history.

(56) References Cited

U.S. PATENT DOCUMENTS

| | | | |
|---|---|---|---|
| 4,007,256 A | 2/1977 | Kim et al. |
| 4,009,252 A | 2/1977 | Izumi et al. |
| 4,028,274 A | 6/1977 | Kunz |
| 4,064,154 A | 12/1977 | Chandra et al. |
| 4,083,803 A | 4/1978 | Oswald et al. |
| 4,128,627 A | 12/1978 | Dyer et al. |
| 4,148,750 A | 4/1979 | Pine |
| 4,279,883 A | 7/1981 | Izumi et al. |
| 4,313,806 A | 2/1982 | Dalton, Jr. et al. |
| 4,335,092 A | 6/1982 | Dalton et al. |
| 4,336,238 A | 6/1982 | Dalton, Jr. et al. |
| 4,336,239 A | 6/1982 | Dalton et al. |
| 4,336,240 A | 6/1982 | Moseley et al. |
| 4,347,231 A | 8/1982 | Michaelson |
| 4,347,232 A | 8/1982 | Michaelson |
| 4,366,085 A | 12/1982 | Ikegami |
| 4,369,128 A | 1/1983 | Moseley et al. |
| 4,379,778 A | 4/1983 | Dalton, Jr. et al. |
| 4,476,242 A | 10/1984 | Puskas et al. |
| 4,503,160 A | 3/1985 | Williams |
| 4,513,098 A | 4/1985 | Tsao |
| 4,661,337 A | 4/1987 | Brill |
| 4,681,751 A | 7/1987 | Gosser |
| 4,701,428 A | 10/1987 | Bellussi et al. |
| 4,713,363 A | 12/1987 | Hucul |
| 4,772,458 A | 9/1988 | Gosser |
| 4,824,976 A | 4/1989 | Clerici et al. |
| 4,826,795 A | 5/1989 | Kitson et al. |
| 4,832,938 A | 5/1989 | Gosser |
| 4,889,705 A | 12/1989 | Gosser |
| 4,937,216 A | 6/1990 | Clerici et al. |
| 4,937,220 A | 6/1990 | Nickols, Jr. |
| 4,983,558 A | 1/1991 | Born |
| 4,996,039 A | 2/1991 | Prahus et al. |
| 5,017,535 A | 5/1991 | Schoonhoven |
| 5,024,905 A | 6/1991 | Itoh et al. |
| 5,061,671 A | 10/1991 | Kitson et al. |
| 5,096,866 A | 3/1992 | Itoh et al. |
| 5,104,635 A | 4/1992 | Kanada et al. |
| 5,128,114 A | 7/1992 | Schwartz |
| 5,132,099 A | 7/1992 | Hiramatsu et al. |
| 5,135,731 A | 8/1992 | Gosser et al. |
| 5,166,372 A | 11/1992 | Crocco et al. |
| 5,169,618 A | 12/1992 | Maraschino |
| 5,180,573 A | 1/1993 | Hiramatsu et al. |
| 5,194,242 A | 3/1993 | Paoli |
| 5,214,168 A | 5/1993 | Zajacek et al. |
| 5,234,584 A | 8/1993 | Birbara |
| 5,236,692 A | 8/1993 | Nagashima |
| 5,320,821 A | 6/1994 | Nagashima et al. |
| 5,338,531 A | 8/1994 | Chuang et al. |
| 5,352,645 A | 10/1994 | Schwartz |
| 5,362,405 A | 11/1994 | Birbara |
| 5,372,981 A | 12/1994 | Witherspoon |

(Continued)

FOREIGN PATENT DOCUMENTS

EP    0864362    9/1998

(Continued)

OTHER PUBLICATIONS

Li, et al, "Preparation and Characterization of Multiwalled Carbon Nanotube-Supported Platinum for Cathode Catalysts of Direct Methanol Fuel Cells", *J. Phys. Chem*, B, Jun. 6, 2003, vol. 107, pp. 6292-6299.

(Continued)

*Primary Examiner*—Ling-Sui Choi
(74) *Attorney, Agent, or Firm*—Workman Nydegger

(57) ABSTRACT

Intermediate precursor compositions for use in manufacturing supported reactive catalysts having a controlled coordination structure, and methods for manufacturing such precursor compositions are disclosed. The precursor compositions include a catalyst complex formed from catalyst atoms and a control agent that is applied to a substrate. Reduction of the catalyst complex yields supported reactive catalyst in which a preponderance of the top or outer layer of atoms of the catalyst particles exhibit a controlled coordination number of 2. The supported catalysts are useful for a variety of chemical reactions, including the preparation of hydrogen peroxide with high selectivity.

64 Claims, 5 Drawing Sheets

U.S. PATENT DOCUMENTS

| | | |
|---|---|---|
| 5,378,450 A | 1/1995 | Tomita |
| 5,391,531 A | 2/1995 | Ward |
| 5,399,334 A | 3/1995 | Kawakami et al. |
| 5,447,706 A | 9/1995 | Van Weynbergh et al. |
| 5,460,734 A | 10/1995 | Birbara |
| 5,480,629 A | 1/1996 | Thompson et al. |
| 5,496,532 A | 3/1996 | Monzen |
| 5,505,921 A | 4/1996 | Luckoff et al. |
| 5,583,085 A | 12/1996 | Ward |
| 5,641,467 A | 6/1997 | Huckins |
| 5,698,488 A | 12/1997 | Birbara et al. |
| 5,767,036 A | 6/1998 | Freund et al. |
| 5,846,895 A | 12/1998 | Gila et al. |
| 5,851,948 A | 12/1998 | Chuang |
| 5,859,265 A | 1/1999 | Muller |
| 5,900,386 A | 5/1999 | Freund et al. |
| 5,912,367 A | 6/1999 | Chang |
| 5,961,948 A | 10/1999 | Wanngard |
| 5,965,101 A | 10/1999 | Goto et al. |
| 5,972,305 A | 10/1999 | Park et al. |
| 6,005,155 A | 12/1999 | Sun |
| 6,042,804 A | 3/2000 | Huckins |
| 6,054,507 A | 4/2000 | Funaki |
| 6,090,858 A | 7/2000 | El-Sayed |
| 6,106,797 A | 8/2000 | Muller |
| 6,117,409 A | 9/2000 | Bertsch-Frank et al. |
| 6,159,267 A | 12/2000 | Hampden-Smith |
| 6,168,775 B1 | 1/2001 | Zhou et al. |
| 6,194,338 B1 | 2/2001 | Andolfatto et al. |
| 6,210,651 B1 | 4/2001 | Nystrom et al. |
| 6,239,054 B1 | 5/2001 | Shukis |
| 6,284,213 B1 | 9/2001 | Paparatto et al. |
| 6,299,852 B1 | 10/2001 | Nystrom et al. |
| 6,307,073 B1 | 10/2001 | Jones |
| 6,331,500 B1 | 12/2001 | Tsuji et al. |
| 6,375,920 B1 | 4/2002 | Fischer et al. |
| 6,387,346 B1 | 5/2002 | Bertsch-Frank et al. |
| 6,447,743 B1 | 9/2002 | Devic et al. |
| 6,500,968 B1 | 12/2002 | Zhou et al. |
| 6,500,969 B1 | 12/2002 | Zhou et al. |
| 6,504,040 B1 | 1/2003 | Vogtel et al. |
| 6,518,217 B1 | 2/2003 | Xing et al. |
| 6,528,683 B1 * | 3/2003 | Heidemann et al. ........ 562/542 |
| 6,534,440 B1 | 3/2003 | Choudhary et al. |
| 6,534,661 B1 | 3/2003 | Zhou et al. |
| 6,551,960 B1 | 4/2003 | Laine et al. |
| 6,576,214 B1 | 6/2003 | Zhou et al. |
| 6,630,118 B1 | 10/2003 | Paparatto |
| 6,635,348 B1 | 10/2003 | Hampden-Smith |
| 6,649,140 B1 | 11/2003 | Paparatto |
| 6,676,919 B1 | 1/2004 | Fischer |
| 6,713,036 B1 | 3/2004 | Vanden Bussche et al. |
| 6,740,615 B1 * | 5/2004 | Zhou ........................... 502/29 |
| 6,746,597 B1 | 6/2004 | Zhou et al. |
| 6,764,671 B1 | 7/2004 | Haas et al. |
| 6,768,013 B1 | 7/2004 | Pujado |
| 6,872,377 B1 | 3/2005 | Fischer et al. |
| 6,888,013 B1 | 5/2005 | Paparatto et al. |
| 2001/0024634 A1 | 9/2001 | Bertsch-Frank et al. |
| 2003/0086853 A1 | 5/2003 | Denc et al. |
| 2003/0180212 A1 | 9/2003 | Huckins |
| 2003/0215383 A1 | 11/2003 | Escrig |
| 2004/0013601 A1 | 1/2004 | Butz |
| 2004/0037769 A1 | 2/2004 | Paparatto et al. |
| 2004/0037770 A1 | 2/2004 | Fischer |
| 2004/0081611 A1 | 4/2004 | Muller et al. |
| 2004/0126312 A1 | 7/2004 | Butz et al. |
| 2004/0151659 A1 | 8/2004 | Paparatto et al. |
| 2004/0151660 A1 | 8/2004 | Paparatto et al. |
| 2004/0184983 A1 | 9/2004 | Paparatto |

FOREIGN PATENT DOCUMENTS

| | | |
|---|---|---|
| EP | 0978316 | 9/2000 |
| EP | 1 160 195 | 12/2001 |
| EP | 1 160 196 | 12/2001 |
| EP | 1 277 701 | 7/2002 |
| EP | 1 308 416 | 5/2003 |
| EP | 1 344 747 | 9/2003 |
| JP | 05017106 | 1/1993 |
| JP | 07033410 | 2/1995 |
| JP | 07069604 | 3/1995 |
| JP | 07069605 | 3/1995 |
| JP | 07241473 | 9/1995 |
| JP | 09241009 | 9/1997 |
| JP | 09301705 | 11/1997 |
| JP | 10324507 | 12/1998 |
| JP | 10330103 | 12/1998 |
| JP | 2003010693 | 1/2003 |
| JP | 2003024794 | 1/2003 |
| WO | WO 98/10863 | 3/1998 |
| WO | WO 00/59635 | 10/2000 |
| WO | WO 01/05501 | 1/2001 |
| WO | WO 02/14217 | 2/2002 |
| WO | WO 02/14299 | 2/2002 |
| WO | WO 02/28527 | 4/2002 |
| WO | WO 02/28528 | 4/2002 |
| WO | WO 02/83550 | 10/2002 |
| WO | WO 02/92501 | 11/2002 |
| WO | WO 02/92502 | 11/2002 |
| WO | WO 03/14014 | 2/2003 |
| WO | WO 04078740 | 9/2004 |

OTHER PUBLICATIONS

Li, et al., "Carbon nanotubes as support for cathode catalyst of a direct methanol fuel cell", *Letters to the Editor/Carbon 40* Dalian University of Technology, (2002), pp. 787-803.

Lordi, et al., "Method for Supporting Platinum on Single-Walled Carbon Nanotubes for a Selective hydrogenation Catalyst", *Chem. Mater.* 2001, vol. 13, pp. 733-737.

Zhou et al, "Novel synthesis of highly active Pt/C cathode electrocatalyst for direct methanol fuel cell", *Chem. Commun.*, Jan. 13, 2003, (3), pp. 394-395.

Zhou, et al., "Preparation and Characterization of Anode Catalysts PtRu/C for Direct Methanol Fuel Cells", *Chemical Journal of Chinese Universities*, vol. 24, No. 5, pp. 858-862.

* cited by examiner

INTERMEDIATE PRECURSOR COMPOSITIONS USED TO MAKE SUPPORTED CATALYSTS HAVING A CONTROLLED COORDINATION STRUCTURE AND METHODS FOR PREPARING SUCH COMPOSITIONS

BACKGROUND OF THE INVENTION

1. The Field of the Invention

The present invention relates to catalysts for use in various chemical processes. More particularly, the invention relates to intermediate precursor compositions used to make supported catalysts having a controlled coordination structure and methods of manufacturing such intermediate precursor compositions.

2. The Relevant Technology

Catalysts are widely used in many industries including chemical, petroleum, pharmaceutical, energy, and automotive. Many of the catalysts used in these industries are based on dispersed particles of certain active components, where the active components are commonly metals or combinations of metals and other elements. In catalysts of this type, the catalytic properties of the materials are determined by both the type of active components selected, i.e., the elemental composition of the catalyst, and the detailed structure of the dispersed particles, i.e., the atomic scale structure and orientation of the dispersed particles.

Historically, much of the work in the development and optimization of catalysts has focused on the selection of the appropriate catalytic components. Prior methods have allowed catalyst developers to control the selection and relative amounts of catalyst components. However, the control of the detailed structure of catalysts, particularly on the atomic scale, has presented a much greater difficulty. Controlling the atomic scale structure can be as important in the development of effective catalysts as selecting the elemental composition. For example, control of the detailed catalyst crystal structure can relate directly to the selectivity of the catalyst. A method which allowed for the controlled exposure of certain kinds of catalytic active sites would allow certain reaction pathways to be favored to an extent that is not currently possible using a catalyst that contains a mixture of different types of active sites.

One particularly useful way of defining a preferred catalytic structure is based on the geometry of the surface active sites. Because of thermodynamic considerations, it is normally the case that particles of crystalline materials will expose one or more of a limited number of low-index crystal faces. Common low-index crystal face exposures of metal particles include, for example, the 111, 100, and 110 crystal faces of the common crystal lattices, which include face-centered cubic (FCC), body-centered cubic (BCC), and hexagonal close-packed (HCP). Exemplary crystal faces are schematically illustrated in FIG. 1. Each of these crystal faces has a different arrangement of atoms, and may therefore display different catalytic properties with respect to certain chemical reactions. Therefore, substantial improvements in catalyst function could theoretically be achieved if a method were available to exert effective control over the atomic-scale structure of catalytic particles. A more detailed description of metal crystal surface structure can be found by accessing the National Institute of Standards and Technology (NIST) WWW home page, particularly the Surface Structure Database (SSD).

Despite the extensive history of catalyst development, there are few, if any, reliable methods which allow the detailed crystal structure of dispersed catalytic particles to be controlled as a way of improving and optimizing catalytic function. In part, this derives from the intrinsic difficulty of controlling structures at an atomic scale. It is also related to a lack of methods to accurately determine whether a desired atomic scale structure has been successfully achieved. Moreover, as difficult as it might be to control the shape of the catalyst crystal lattice, one of skill in the art would find it even more difficult to control the crystal face exposure of a catalyst crystal.

Attempts have been made to control the crystal lattice structure of active catalyst particles. An article by Termer S. Ahmadi, et al. of Georgia Institute of Technology, entitled "Shape-Controlled Synthesis of Colloidal Platinum Nanoparticles", published in Science, Vol. 272, pp. 1924–26, describes a method for the synthesis of shape-controlled platinum particles by controlling the ratio of the concentration of shaping material to that of ionic platinum. "Tetrahedral, cubic, irregular-prismatic, icosheldral, and cubo-octahedral particle shapes were observed, whose distribution was dependent on the concentration ratio of the capping polymer material to the platinum cation." Id, p. 1924. The article is silent, however, with respect to how to control crystal face exposure of a given crystal shape. Moreover, the article not only fails to teach how to select or increase the preponderance of one crystal face exposure of a catalyst crystal structure over another, it provides no teaching or suggestion that would motivate the selection of any particular crystal face exposure over another.

BRIEF SUMMARY OF THE INVENTION

The present invention is directed to precursor compositions used to make a range of supported catalysts that have increased specificity for certain reactions and methods for manufacturing such precursor compositions. The inventive precursor compositions are designed to yield supported catalysts in which a preponderance of the top or outer surface of reactive catalyst atoms have a nearest neighbor coordination number of 2. That is, the catalytically reactive atoms in the supported catalyst are arranged so that a preponderance of individual catalyst atoms are coordinated with exactly two other catalyst atoms within the top or outer layer.

Providing catalytically reactive atoms having a coordination number of 2 on the reactive surfaces of a supported catalyst greatly limits how chemical reactants in a given chemical reaction are arranged and distributed on the catalyst surface during the catalyzed chemical reaction. Limiting how the chemical reactants are arranged and distributed by the catalyst atoms directly influences and controls the range and type of possible reaction products that can be produced given the concentration and identity of chemical reactants. By way of example and not limitation, although oxygen and water can react together to form both water ($H_2O$) and hydrogen peroxide ($H_2O_2$), water is thermodynamically favored and will usually be formed over hydrogen peroxide absent some way to alter the reaction conditions. This is also true in the case of catalyzed reactions between oxygen and hydrogen, in which the formation of water is naturally favored. It has now been discovered that providing a catalyst in which a preponderance of the catalytically reactive atoms are arranged so as to have a coordination number of 2 on the top or outer layer exhibits high selectivity that favors the production of hydrogen peroxide over water using a feed stream comprising oxygen and hydrogen.

In one embodiment, the precursor compositions according to the invention include one or more catalyst atoms complexed with one or more control or templating agents to form an intermediate catalyst complex that is selected so as to promote the formation of supported catalysts in which a preponderance of the catalytically reactive atoms have a coordination number of 2 in the top or outer layer. According to another embodiment, precursor compositions according to the invention may further include one or more liquid solvents, carriers or dispersing agents. According to yet another embodiment, precursor compositions according to the invention may further include one or more support particles or substrates.

The inventive precursor compositions, together with methods for depositing catalytically reactive atoms onto a support, control which face of the catalyst crystallite is predominantly exposed. Examples of low-index crystal faces having a coordination number of 2 include the (110) crystal face of face centered cubic (FCC) or hexagonal closed packed (HCP) crystal lattices, which includes linear rows of atoms in the top or outer layer, the (101), (122), or (120) crystal face of a HCP crystal lattice, and (112), (122) or (123) crystal face of a body-centered cubic (BCC) crystal lattice. Forming a catalyst crystal or crystallite may inevitably occur and is the currently understood method for producing catalyst particles in which a top or outer layer of catalyst atoms have a coordination number of 2. Nevertheless, it is, at least theoretically, not essential for the catalytically reactive atoms to form a catalyst crystal per se, only that a preponderance of the top or outer layer of atoms in the catalyst particles attached to the support have a coordination number of 2. It may be possible to obtain increased reaction specificity regardless of whether the atoms are aligned as straight rows, in a zig-zag formation, or in less ordered rows having no uniform shape so long as a preponderance of the catalytically reactive atoms have a coordination number of 2.

According to one embodiment, at least about 50% of the catalytically reactive atoms formed using the inventive precursor compositions will advantageously have a coordination number of 2 in the top or outer layer of atoms. Preferably, at least about 60% of the catalytically reactive atoms will have a coordination number of 2 in the top or outer layer of atoms, more preferably at least about 70% of the catalytically reactive atoms in the top or outer layer, more especially preferably at least about 80% of the catalytically reactive atoms in the top or outer layer, and most preferably at least about 90% of the catalytically reactive atoms in the top or outer layer. Reaction selectivity would be expected to be even further increased where at least about 95% of the catalytically reactive atoms in the top or outer layer have a coordination number of 2. Reaction selectivity would be maximized in the case where 100% of the catalytically reactive atoms in the top or outer layer have a coordination number of 2

Supported catalysts according to the invention, in addition to providing reactive catalyst atoms in which a preponderance of the atoms in the top or outer layer have a coordination number of 2, may include individual catalyst particles that (a) are of small size (e.g., as small as 10 nanometers or less), (b) have uniform size, shape, and distribution, and (c) are reliably anchored to the support so as to resist agglomeration and/or crystal face reorientation.

A variety of different elements can be used as the catalyst atoms within the inventive precursor compositions. For example, the catalyst atoms may include one or more noble metals, base transition metals, rare earth metals, and even non-metals. In addition to the foregoing catalyst atoms, alkali metals and alkaline earth metals may be present. The forgoing catalyst atoms can be utilized alone or in combination as desired to yield a final supported catalyst having a desired catalytic reactivity and/or selectivity relative to one or more targeted chemical reactions.

The invention contemplates the use of a variety of different control or templating agents that, when complexed with one or more catalyst atoms to form an intermediate catalyst complex, can be used in the formation of supported catalysts in which the top or outer layer of catalytically reactive atoms have a coordination number of 2. In one aspect, the control or templating agents are capable of forming complexes with the desired catalyst atoms in a precursor solution. Because of specific structural and chemical properties, the control agents mediate in the formation of catalyst particles or crystallites, causing the preferential formation of specific and desirable structures. Specifically, the intermediate catalyst complex interacts during catalyst particle formation to induce the formation of dispersed particle structures with a predominant exposure of controlled coordination crystal face structures with a top or outer layer of catalytically reactive atoms have a nearest neighbor coordination number of 2.

Control agents within the scope of the invention include a variety of different polymer, oligomer, or organic molecules. Each control agent molecule has a structural backbone along which are disposed a plurality of functional groups for complexing the catalytically reactive atoms to the control agent. In some cases, the catalyst atoms may be complexed by functional groups provided by two or more different compounds or polymers. For example, 8 catalyst atoms having a valence of 2 might be complexed on one side by 8 functional groups provided by a first polymer, oligomer, or organic molecule and on an opposite side by 8 functional groups provided by a second polymer, oligomer, or organic molecule.

It has now been found that the tendency of the catalytically reactive atoms to be arranged on a support so as to have a coordination number of 2 on the top or outer layer is at least partially determined by the percentage of straight-chained molecules comprising the control agent, as opposed to molecules that are branched. More specifically, increasing the percentage of straight-chained molecules has been found to increase the tendency of the catalytically reactive atoms to have a coordination number of 2. In view of this, the control agent typically includes polymer, oligomer, or organic molecules in which at least about 50% are straight-chained. In a preferred embodiment, at least about 60% of the polymer, oligomer, or organic molecules of the control agent will be straight-chained, more preferably at least about 75%, even more preferably at least about 90%, and most preferably at least about 95%. The tendency of the catalytically reactive atoms to be arranged so as to have a coordination number of 2 on the top or outer layer will be maximized where 100% of the polymer, oligomer, or organic molecules comprising the the control agent are straight-chained.

In some cases, the tendency of a control polymer, oligomer or organic molecule to be straight-chained increases with decreasing molecular weight. An example of a control polymer or oligomer that is more linear with reduced molecular weight is polyacrylic acid. Decreasing the molecular weight of polyacrylic acid decreases its length, which, in turn statistically reduces the likelihood that a particular polyacrylic acid polymer or oligomer will be branched. The use of excess control agent is believed to result in catalytically active particles that are smaller in size and more evenly dispersed on the support surface.

Depending on how the final supported catalyst is formed, the control agent may also act to chemically anchor the reactive catalyst particles to a support. Preferably, the support has a plurality of hydroxyl or other functional group on the surface thereof that are able to chemically bond to one or more functional groups of the control agent, such as by a condensation reaction. One or more additional functional groups of the control agent are also bonded to one or more atoms within the catalyst particle, thereby anchoring the catalyst particle to the support. Reliably anchoring the catalyst particles to the support helps keep the catalyst active over time by reducing the tendency of the catalyst particles to become agglomerated together, which would reduce the available surface area of the catalyst particles. Anchoring the catalyst particles to the support also reduces or eliminates the tendency of the catalyst particles to become separated entirely from the support, which may also reduce the efficacy of the catalyst.

It is within the scope of the invention to arrange catalyst particles according to the invention on any known support. Support substrates may be 2-dimensional or 3-dimensional, may be porous or nonporous, and may comprise organic or inorganic materials. The support may itself be catalytic or it may be inert. Exemplary support materials include, but are not limited to, alumina, silica, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures. Another important class of supports preferred for some applications are carbon-based materials, such as carbon black, activated carbon, graphite, fluoridated carbon, and the like. The support material may also be constructed of a metal or metal alloy.

The complexed catalyst atoms are generally in the form of a metal salt solution or colloidal suspension including, but not limited to, chlorides, nitrates, phosphates, sulfates, tungstates, acetates, citrates, and glycolates. A solvent may be used as a vehicle for either the catalytic component or the control agent. Preferred solvents include water, dilute aqueous acids, methanol, ethanol, normal and isopropanol, acetonitrile, acetone, tetrahydrofuran, ethylene glycol, dimethylformamide, dimethylsulfoxide, methylene chloride, and the like, including mixtures thereof. The precursor solution or colloidal suspension may be acidified with any suitable acid, including organic and inorganic acids.

Exemplary methods for making precursor compositions according to the invention include providing catalyst atoms in solution (e.g., in the form of an ionic salt), providing a control agent in solution (e.g., in the form of a carboxylic acid salt), and reacting the catalyst atoms with the control agent to form a precursor composition comprising an intermediate catalyst complex of the catalyst atoms and the control agent. In one aspect of the invention, the "precursor composition" may be considered to be the intermediate catalyst complex formed from the catalyst atoms and the control agent, exclusive of the surrounding solvent or carrier. Indeed, it is within the scope of the invention to create such a complex in solution, or as a colloidal suspension, and then remove the solvent or carrier so as to yield a solid precursor catalyst complex that can be later added to an appropriate solvent or carrier to reconstitute a solution or colloidal suspension containing the catalyst complex. Thus, in another aspect of the invention, "precursor compositions" according to the invention may include one or more different solvents or carriers into which an intermediate catalyst complex has been dispersed.

In order to form a supported catalyst, the intermediate catalyst complex is applied to a support, typically by means of an appropriate solvent or carrier in order to apply or impregnate the catalyst complex onto the support. Thus, in yet another aspect of the invention, "precursor compositions" according to the invention may include the catalyst complex, a solvent or carrier, and a support onto which the catalyst complex is applied. Thereafter, the solvent or carrier is removed, optionally in connection with a reaction step that causes the control agent to become bonded to the support. This yields a supported precursor catalyst in which the catalyst atoms have been arranged in a desired fashion, but not yet exposed or otherwise activated.

In order to expose at least a portion of catalyst atoms and yield an active supported catalyst, a portion of the control agent is removed, such as by reduction, e.g., hydrogenation. The resulting catalyst can be optionally heat-treated to further activate the catalyst atoms. In a preferred embodiment, the process of removing the control agent to expose the catalyst atoms is carefully controlled to ensure that enough of the control agent remains so as to reliably anchor the catalyst particles to the support. Thus, at least that portion of the control agent interposed between the support and the bottom surface of the catalyst particles facing the support is advantageously left intact. What remains of the control agent may be considered to comprise an "anchoring agent." (In addition to the remaining portion of the control agent, the "anchoring agent" may optionally comprise other polymers, oligomers or organic compounds that are interposed between the catalyst particles and support and that aid in anchoring the catalyst particles to the support.)

On the other hand, removing the control agent to the extent that little or any of it remains to anchor the catalyst particles to the support has been found to reduce the long-term stability of the supported catalyst. Removing all of the control agent may greatly reduce the long-term stability of the supported catalyst. Whereas removing all of the control agent may initially yield catalyst particles having the desired crystal face exposure, leaving behind insufficient control agent and/or failing to provide another polymer, oligomer, or organic compound to reliably bind the catalyst particles to the support results in catalyst particles that are considerably more mobile. This, in turn, results in a greater tendency of the catalyst particles to become agglomerated when exposed to heat (e.g., such as when the catalyst is in use) and/or separated from the support altogether.

By way of example, supported catalysts according to the invention may be useful in catalytically promoting the following chemical reactions:

1. Reactions involving hydrogen and oxygen to selectively form hydrogen peroxide instead of water. The hydrogen peroxide so formed may be used or sold as a product or used as an oxidizing agent in an integrated manufacturing process to form other chemical products;
2. Reactions involving hydrogen, oxygen, and organic compounds to form chemical products, e.g., in situ formation of hydrogen peroxide as an intermediate oxidizing agent that reacts with the organic compound to form other chemical products;
3. Reactions involving oxygen and organic compounds to form oxidized chemical products, i.e., direct oxidation without hydrogen peroxide as an intermediate;

4. Reactions between hydrogen and organic compounds to form chemical or fuel products, i.e., hydrogenation, hydrotreating and hydrocracking;
5. Reactions of chemical products to liberate hydrogen, i.e., dehydrogenation and reforming; and
6. Electrochemical reactions of hydrogen and/or oxygen at fuel cell electrodes.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction and Definitions

Figure 1B:
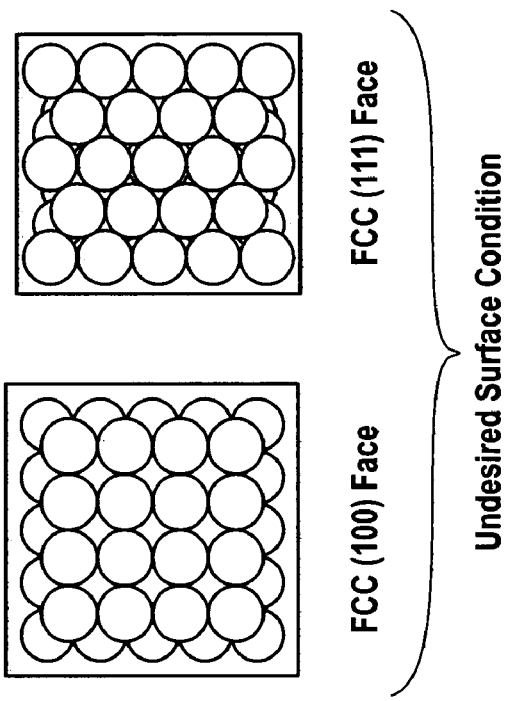
FIGS. 1A and 1B schematically depict exemplary low-index crystal faces.

The present invention is directed to intermediate precursor compositions for making supported catalysts in which a preponderance of the top or outer layer of reactive catalyst atoms have a nearest neighbor coordination number of 2. Supported catalysts made using the inventive precursor compositions exhibit high specificity for a variety of different chemical reactions. The invention also relates to methods for manufacturing such intermediate precursor compositions.

The term "precursor composition" refers to a range of intermediate compositions that are used to manufacture reactive supported catalysts having a controlled coordination structure. The precursor compositions themselves may not be catalytically active unless further processed. Examples of inventive precursor compositions include (1) intermediate catalyst complexes comprising catalyst atoms complexed with a control agent; (2) solutions or colloidal suspensions comprising an intermediate catalyst complex and a solvent or carrier; (3) solutions or suspensions comprising an intermediate catalyst complex, solvent or carrier, and a support (whether or not the catalyst complex is actually bonded to the support); and (4) an intermediate catalyst complex bonded to a support in the absence of a solvent or carrier.

The terms "intermediate catalyst complex" and "catalyst complex" refer to a solution, colloid or suspension in which a bond or coordination complex is formed between a control or templating agent and one or more different types of catalyst atoms. The "bond" between the control agent and catalyst atoms may be ionic, covalent, electrostatic, or it may involve other bonding forces such as coordination with nonbonding electrons, Van Der Waals forces, and the like.

The terms "control agent" and "templating agent" refer to a class of polymers, oligomers, or organic compounds which promote the formation of supported catalyst particles having the controlled coordination structure of the present invention. Within the intermediate precursor composition, the control or templating agent first forms an intermediate catalyst complex with the catalyst atoms in order to form a solution or dispersion of catalyst atoms in a solution or colloidal suspension. When deposited onto a support, the intermediate catalyst complex forms an ordered array of catalyst atoms. Upon removal of a portion of the control agent, a preponderance of the exposed catalyst atoms are arranged so as to have a nearest neighbor coordination number of 2.

The term "catalyst atom" refers to metallic or non-metallic atoms that are complexed with the control or templating agent to form an intermediate catalyst complex. After removing a portion of the control agent, the catalyst atoms become "reactive catalyst atoms" that are able to catalytically promote a desired chemical reaction.

The term "catalyst particle" refers to the catalytically active portion of a supported catalyst. In some (or perhaps) all cases, the catalyst particles will be "crystal particles" in which the reactive catalyst atoms are arranged in an ordered crystal structure. Nevertheless, it is within the scope of the invention to form supported reactive catalysts in which the active catalyst particles are not arranged in an ordered crystal structure. A distinguishing feature of the inventive catalyst particles according to the invention is that a preponderance of reactive catalyst atoms on a top or outer layer of the catalyst particles will have a nearest neighbor coordination number of 2.

The term "crystal face" refers to the top or outer layer of reactive catalyst atoms within a catalyst crystal. The terms "crystal face exposure" and "crystal face exposition" refer to the specific arrangement of catalyst atoms within a particular crystal face (e.g, low index crystal face exposures (100), (110), and (111)).

The terms "controlled phase exposition" or "controlled face exposure" are used herein to refer to the situation where a catalytic crystal or particle has a top or outer layer of catalyst atoms in desired coordination structure.

The term "coordination number of 2" refers to a crystal face exposure, whether low or high index, in which the reactive catalyst atoms on the top or outer layer are arranged so that each atom, except the terminal atoms in a given row, is coordinated with exactly 2 other catalyst atoms. The terminal atoms of each row will, of course, be coordinated with only 1 other catalyst atom, yet are considered to have a "coordination number of 2" for purposes of determining the percentage of top or outer layer catalyst atoms that have a nearest neighbor coordination number of 2. In the case of catalyst particles that are not really crystals, the reactive catalyst atoms in top or outer layer may or may not actually emulate a true crystal face.

The term "supported reactive catalyst" refers to a composition containing one or more catalyst particles attached to a support. The support itself may be catalytically active or it may be catalytically inert.

II. Overview of Supported Reactive Catalysts

Supported reactive catalysts that can be manufactured using the inventive precursor composition include catalyst particles in which a preponderance of catalyst atoms in the top or outer layer have a nearest neighbor coordination number of 2. To better understand what is meant by the term "coordination number of 2" and why reactive catalyst atoms so arranged have high selectivity for certain reactions, reference is made to FIGS. 1 and 2.

Figure 1A:
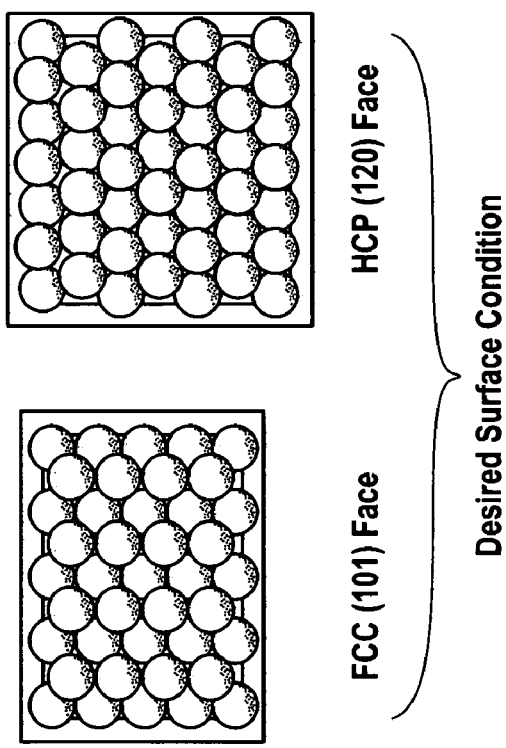

FIGS. 1A and 1B schematically illustrate crystal face exposures that are either desired or undesired. The desired presentation is distinguished by exhibiting predominantly a coordination number of 2 for the top or outer layer of catalyst atoms of the crystal face, in contrast to the undesired crystal face exposure having a higher coordination number. The FCC (110) face and HCP (120) face exposures of FIG. 1A are examples of desired atomic arrangements in which the top or outer layer atoms have a coordination number of 2. The top or outer layer of atoms in the FCC (110) face exposure are arranged in a linear fashion, while the top or outer layer of atoms in the HCP (120) face exposure are arranged in a zig-zag fashion. In each case, each catalyst atom within the top or outer layer is coordinated with exactly 2 other catalyst atoms (except for the terminal atoms in each row, which are coordinated with 1 catalyst atom). As discussed more fully below, this arrangement of catalyst atoms favors the formation of hydrogen peroxide instead of water when the catalyst is used to catalyze a reaction using a feed stream containing oxygen and hydrogen.

In contrast to the favored face exposures, the FCC (100) face and FCC (111) face exposures of FIG. 1B are examples of less desired or undesired arrangements because the top or outer layer of catalyst atoms are coordinated with more than 2 other catalyst atoms. In the case of the FCC (100) face exposure, each interior catalyst atom in the top or outer layer is coordinated with 4 other catalyst atoms. For the FCC (111) face exposure, each interior catalyst atom in the top or outer layer is coordinated with 6 other catalyst atoms. Both FCC (100) and (111) face exposures are non-selective for hydrogen peroxide over water. Since water is thermodynamically favored (i.e., because it is much more stable than hydrogen peroxide), both FCC (100) and (111) face exposures favor the formation of water.

Figure 2B:
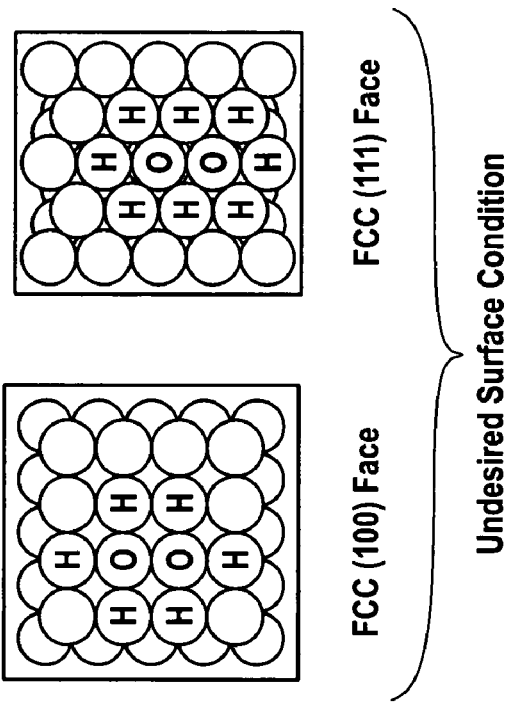
FIGS. 2A and 2B schematically compare how hydrogen and oxygen are arranged or coordinated relative to catalyst atoms on different low-index crystal faces.
Figure 2A:
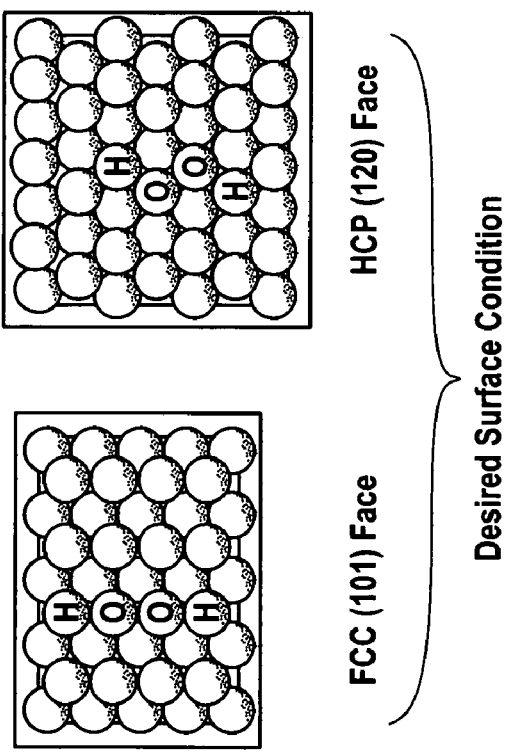

To better illustrate how catalyst particles in which the top or out layer of reactive catalyst atoms have a nearest neighbor coordination number of 2 favor the formation of the less thermodynamically favored hydrogen peroxide over water, reference is made to FIGS. 2A and 2B. As seen in FIG. 2A, catalyst atoms having the desired exposure allow for controlled surface adsorption of hydrogen and oxygen on the catalyst particle surface in a presentation which, at least in theory, only allows for the production of hydrogen peroxide. Both hydrogen and oxygen exist as diatomic molecules that contain two atoms of hydrogen (H—H, or $H_2$) or two atoms of oxygen (O=O, or $O_2$), respectively, (where "—" denotes a single bond and "=" denotes a double bond). Because oxygen normally forms two bonds, but hydrogen only forms one bond, when adsorbed onto or coordinated with catalyst atoms in FCC (110) and HCP (120) face exposures, the only arrangement of hydrogen and oxygen molecules that promotes a reaction between individual hydrogen and oxygen atoms is (H O O H), as shown in FIG. 2A. Upon formation of molecular bonds between the coordinated hydrogen and oxygen atoms, a hydrogen peroxide molecule (H—O—O—H) is formed.

The only other possible arrangements of hydrogen and molecules relative to every group of four catalyst atoms having a coordination number of 2, i.e., (H H H H), (O O O O) and (H H O O), do not promote reactions between hydrogen and oxygen. No arrangements of $H_2$ and $O_2$ molecules promote the formation of water because that would require a lone oxygen atom to be coordinated with two hydrogens (H O H) to form water (H—O—H). However, lone oxygen atoms are not normally found within a feed stream of oxygen gas under typical reaction conditions. Thus, hydrogen peroxide formation is favored over water.

In contrast to FCC (110) and HCP (120) face exposures, an undesired surface coordination of the top-layer atoms, e.g., FCC (100) and FCC (111) face exposures, does not exhibit specificity to the production of hydrogen peroxide over water. FIG. 2B depicts possible arrangements of oxygen and hydrogen atoms when adsorbed onto or coordinated with catalyst atoms in both the FCC (110) and HCP (120) face exposures. When oxygen and hydrogen are so arranged, only water is formed. Admittedly, FIG. 2B depicts the worst-case scenario for the production of hydrogen peroxide. Given a random distribution of hydrogen and oxygen molecules adsorbed onto or coordinated with catalyst atoms in FCC (110) and HCP (120) face exposures, both hydrogen peroxide and water can be produced. However, because water is far more stable, its production is thermodynamically favored over hydrogen peroxide.

In order to overcome the tendency of conventional catalysts to produce water instead of hydrogen peroxide, other strategies must be employed to obtain a commercially viable concentration of hydrogen peroxide formation. For example, a feed stream substantially richer in oxygen than in hydrogen can increase the likelihood that the oxygen and hydrogen atoms can be arranged on the catalyst surface so as to form hydrogen peroxide. However, substantially altering the relative concentrations of oxygen and hydrogen in this manner can slow down the reaction and decrease yields. In contrast, employing a catalyst in which a preponderance of catalyst atoms have a coordination number of 2 favors the production of hydrogen peroxide over water by virtue of the catalyst alone. This is a huge advantage over conventional catalysts.

It should be understood that the crystal phase exposures illustrated in FIGS. 1 and 2 are non-limiting examples of catalyst atoms in the top or outer layer having a coordination number of 2. The present invention contemplates any arrangement of top or outer layer atoms exhibiting a nearest neighbor coordination number of 2, i.e., in which all other nearby atoms are spaced at greater than nearest neighbor spacing, are not located in the top or outer layer of atoms, or both. For the purposes of this invention, the nearest neighbor spacing referred to in the above description is the actual nearest neighbor spacing within the top atomic layer of the crystal. This spacing may be similar to the nearest neighbor spacing of the bulk crystal lattice of the catalytic component, but may differ from that bulk spacing to some extent because of crystal structure deformations or relaxations that may occur at exposed surfaces of crystalline materials.

The preferred coordination structure is believed to encourage reactions between adsorbed components located on nearest neighbor coordinated sites, while discouraging or substantially preventing reactions occurring between non-coordinated sites located where there is greater than nearest neighbor spacing. By restricting the number of nearest neighbor sites available for intermolecular or interatomic reactions on the catalyst surface, the controlled coordination structure is believed to be responsible for the very high selectivity which can be achieved using catalysts of this invention. For instance, a selectivity of up to 100% can be achieved in one application of the invention wherein a catalyst comprising palladium including top or outer surface atoms having a coordination number of 2 is employed to produce hydrogen peroxide from hydrogen and oxygen gas feed streams.

As discussed above, controlled coordination structures according to the invention may include linear configurations, such as the FCC (110) face shown in FIG. 1A, or a zigzagged configuration, such as the HCP (120) face also shown in FIG. 1A. The controlled coordination structures of the present invention also includes several families of low-index crystal faces which have been found to have suitable coordination structures and are useful structures for the catalysts of this invention. Examples include:

(a) the (110) face of the FCC (face-centered cubic) lattice, (b) the (221), (331) and (332) crystal faces of the FCC lattice;

(c) the (110) crystal face of the HCP (hexagonal closed packed) lattice, including (220), (330), etc.

(d) the (101) crystal face of the HCP lattice, including (202), (303), etc.

(e) the (122) crystal face of the HCP lattice;

(f) the (120) crystal face of the HCP lattice;

(g) the (122) crystal face of the BCC (body-centered cubic) lattice; and (h) the (112) and (123) crystal face of the BCC lattice.

In all of the above crystal face designations, it will be understood by those skilled in the art that each named crystal face has many alternate Miller index designations, each of which are equivalent to those listed above. All of the unnamed but equivalent crystal face designations should be understood to be included within the scope of this invention. For example, in the FCC and BCC crystal lattices, all three coordinate directions are equivalent. In this example, the (110) crystal face is identical to the (101) and the (011) crystal faces. For the HCP lattice, only the first two coordinates are equivalent. For example, the (101) and the (011) crystal faces are identical, while the (110) crystal face is distinct.

Figure 3:
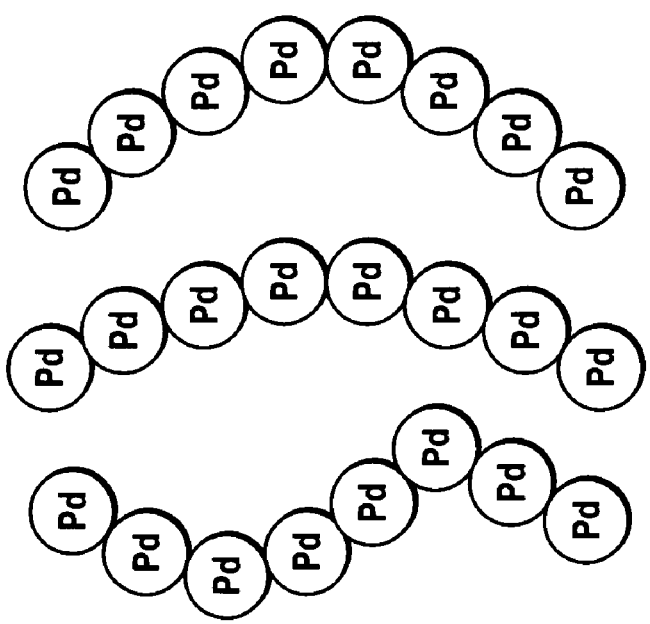
FIG. 3 is a schematic diagram of a top view of an exemplary top or outer layer of reactive catalyst atoms having a coordination number of 2 and arranged in non-regularly arranged rows.

Theoretically, the term "coordination number of 2" may include catalytically reactive atoms in any arrangement so long as the catalyst atoms in the top or outer layer have a nearest neighbor coordination with only 2 catalyst atoms. As shown in FIG. 3, alternative arrangements of top or outer layer atoms exhibiting a nearest neighbor coordination number of 2 may include less ordered rows that are not normally associated with an ordered crystal lattice. So long as the top or outer layer of catalyst atoms have a nearest neighbor coordination number of 2, catalyst particles of that type should still favor the production of hydrogen peroxide over water.

According to one embodiment, at least about 50% of the reactive catalyst atoms in the top or outer layer in a supported reactive catalyst will advantageously have a coordination number of 2. Preferably, at least about 60% of the reactive catalyst atoms in the top or outer layer will have a coordination number of 2, more preferably at least about 70% of the reactive catalyst atoms in the top or outer layer, more especially preferably at least about 80% of the reactive catalyst atoms in the top or outer layer, and most preferably at least about 90% of the reactive catalyst atoms in the top or outer layer will have a coordination number of 2. Reaction selectivity would be expected to be even further increased where at least about 95% of the reactive catalyst atoms in the top or outer layer have a coordination number of 2. Reaction selectivity would be maximized in the case where 100% of the reactive catalyst atoms in the top or outer layer have a coordination number of 2.

The catalyst particles of the present invention may be present in any size, but it is preferred that they be of small size, in the 1–100 nm size range. While not essential, it is also preferred that the catalytic particles be of generally uniform size. Furthermore, it is also preferred that the catalytic particles be uniformly dispersed on the support to reduce the effects of interparticle interaction, which can lead to undesirable effects, such as loss of activity or loss of selectivity due to, e.g., particle agglomeration or sintering.

In the case where two or more different types of catalyst atoms are used, it is possible, according to the concepts described herein, for supported catalysts to include an even distribution of catalyst atoms. This is a significant departure from conventional methods of manufacturing supported catalysts, in which different catalyst atoms are typically clustered together due to the natural tendency of catalyst atoms to attract and congregate with like atoms. Thus, in a conventional catalyst comprising a mixture of palladium and platinum, the majority of palladium atoms will be clustered together in crystals where palladium predominates, and the the majority of platinum atoms will be clustered together in crystals where platinum predominates. In contrast, the ability to complex individual atoms using the control or templating agent, as discussed more fully below, allows for intimate, even a highly randomized, mixing of two or more different types of catalyst atoms.

The supported reactive catalysts having a controlled coordination structure are useful in various reactions, including formation of hydrogen peroxide, formation and use of hydrogen peroxide as an intermediate reactant in the oxidation of organic molecules, direct oxidation of organic molecules, hydrogenation, reduction, dehydrogenation, and, potentially, to make fuel cells.

The catalytic materials, control agents, support materials, and other components which may be selected to form catalytic particles according to the present invention will now be discussed in detail.

III. Precursor Compositions

The inventive precursor compositions may include any component that aids in the formation of supported catalysts in which the catalyst particles include a preponderance of catalyst atoms in the top or outer layer having the desired controlled coordination structure. Examples include, but are not limited to, catalyst atoms, control or templating agents, intermediate catalyst complexes formed from catalyst atoms and control agents, solvents or carriers, and support materials.

A. Intermediate Catalyst Complexes

Intermediate catalyst complexes include one or more different types of catalyst atoms complexed with one or more different types of control or templating agents. When so complexed, the catalyst atoms are arranged in such a manner that, when the intermediate catalyst complex is used to manufacture a supported reactive catalyst and a portion of the control agent is removed to expose a portion of the catalyst atoms in a desired manner, that a preponderance of reactive catalyst atoms will have a desired controlled coordination structure.

1. Catalyst Atoms

Any element or group of elements that can exhibit catalytic activity can be used to form catalyst complexes and catalyst according to the invention. These include elements or groups of elements that exhibit primary catalytic activity, as well as promoters and modifiers. As the primary catalytic active component, metals are preferred. Exemplary metals can include noble metals, base transition metals, and rare earth metals. Catalyst particles may also comprise non-metal atoms, alkali metals and alkaline earth metals, typically as modifiers or promoters.

Examples of base transition metals that may exhibit catalytic activity include, but are not limited to, chromium, manganese, iron, cobalt, nickel, copper, zirconium, tin, zinc, tungsten, titanium, molybdenum, vanadium, and the like. These may be used alone, in various combinations with each other, or in combinations with other elements, such as noble metals, alkali metals, alkaline earth metals, rare earth metals, or non-metals.

Examples of noble metals, also referred to as platinum-group metals, that exhibit catalytic activity, include platinum, palladium, iridium, gold, osmium, ruthenium, rhodium, rhenium, and the like. These may be used alone, in various combinations with each other, or in combinations with other elements, such as base transition metals, alkali metals, alkaline earth metals, rare earth metals, or non-metals.

Noble metals are particularly well-suited for use in this invention for a variety of reasons. They are highly active catalysts which are useful in numerous chemical transformations. When dispersed, they can form small crystallites on which the desired controlled coordination surface structure can be obtained having one or more of the known low-index crystal faces of the noble metal crystal lattice. Because they are very expensive, it is particularly desirable to make the most efficient possible use of the noble metal constituents by assuring that a preponderance of the most desired active sites are exposed.

Examples of rare earth metals that exhibit catalytic activity include, but are not limited to, lanthanum and cerium. These may be used alone, in various combinations with each other, or in combinations with other elements, such as base transition metals, noble metals, alkali metals, alkaline earth metals, or non-metals.

Examples of non-metals include, but are not limited to, phosphorus, oxygen, sulfur and halides, such as cholorine, bromine and fluorine. These are typically included as functionalizing agents for one or more metals, such as those listed above.

The preferred catalytically active component will depend on the specific application. For example, one advantageous use of the catalyst of this invention is the direct synthesis of hydrogen peroxide from hydrogen and oxygen, either as a product or as a chemical intermediate in the synthesis of other chemical products. In this application, the preferred catalyst active component is palladium, either alone or in combination with other metals (e.g., platinum).

Another useful application of the invention is catalytic hydrogenation, in which a preferred primary active component is platinum, palladium, nickel, cobalt, copper or iron, either alone or in combination with each other and/or other components.

Another useful application of the invention is catalytic reforming, in which the preferred catalytic active component is platinum, which may be used alone or in combination with other components. Platinum is also a preferred primary active component when the subject catalyst is used as the cathode and/or anode catalyst in a fuel cell, such as a polymer electrolyte membrane (PEM) or a direct methanol fuel cell (DMFC).

When added to an appropriate solvent or carrier to form an intermediate precursor composition, the catalyst atoms will typically be in ionic form so as to more readily dissolve or disperse within the solvent or carrier. In the case of a metallic catalyst, the catalyst atoms may be in the form of a metal halide, nitrate or other appropriate salt that is readily soluble in the solvent or carrier, e.g., metal phosphates, sulfates, tungstates, acetates, citrates, or glycolates.

2. Control Agents

In order to achieve the highly controlled specificity of catalyst formation, a control agent or templating agent is selected to promote the formation of catalyst crystals or particles in which a preponderance of the top or outer layer atoms have a coordination number of 2. Through use of one or more specific control agents, the present invention provides a means to control the process whereby the catalytic particles are formed, ensuring that these particles predominantly expose a desired crystal face.

Control or templating agents within the scope of the invention include a variety of polymer, oligomer or organic compounds, comprising individual molecules, that mediate in the formation of the dispersed catalyst particles. The control agent molecules include a plurality of functional groups disposed along a backbone that are able to form a complex between the catalyst atoms and the control agent. When catalytic particles are formed from the intermediate catalyst complex, the structure, conformation, or other properties of the control or templating agent cause formation of the catalyst particles to proceed in a controlled fashion, favoring the formation of controlled coordination structures.

In general, useful control agents include polymers, oligomers, and organic compounds that can form catalyst complexes within an intermediate precursor composition that includes the control agent, catalyst atoms, an appropriate solvent or carrier, and optional promoters or support materials. The control agent is able to interact and complex with catalyst atoms dissolved or dispersed within an appropriate solvent or carrier through various mechanisms, including ionic bonding, covalent bonding, van der Waals interaction, or hydrogen bonding. In order to do this, the control agent includes one or more appropriate functional groups.

In one embodiment, the functional groups comprise a carbon atom bonded to at least one electron-rich atom that is more electronegative than the carbon atom and that is able to donate one or more electrons so as to form a bond or attraction with a catalyst atom. Preferred control agents include functional groups which have either a negative charge or one or more lone pairs of electrons that can be used to complex a catalyst atom. This allows the control agent to have a strong binding interaction with dissolved catalyst atoms, which are preferably in the form of positively charged ions in solution.

In one embodiment, the functional groups of the control agent comprise carboxyl groups along the backbone of the control agent molecules, either alone or in combination with other types of functional groups. In other embodiments, the functional groups may include one or more of hydroxyl, ester, ketone, aldehyde, amine, or amide groups, and combinations thereof.

Control agents according to the invention are advantageously organic polymers, oligomers or compounds; however, the control agent may be an inorganic compound (e.g., silicon-based). The control agent may be a natural or synthetic compound. In the case where the catalyst atoms are metals and the control agent is an organic compound, the catalyst complex so formed is an organometallic complex.

Preferred control agents include a variety of oligomers and polymers. In the case where the control agent is an oligomer or polymer, the molecular weight, measured in number average, is preferably in a range from about 300 to about 15,000 Daltons, more preferably in a range of about 600 to about 6000 Daltons. However, it is recognized that even high molecular weight polymers, i.e., greater than 15,000, can be used as the control agent if they are readily soluble in solvents, carriers or vehicles compatible with the catalyst atoms and able to form an organometallic complex.

The molecular weight may be selected to yield a control agent polymer, oligomer or molecule having a desired number of functional groups. In general, the number of functional groups may range from 4 to 200, preferably from about 8 to about 80 functional groups, and more preferably from about 10 to about 20 functional groups. In many cases, the number of functional groups within a polymer or oligomer at least approximately corresponds to the number of repeating units. As stated elsewhere, it may be possible to reduce or minimize branching by selecting a control polymer or oligomer having fewer repeating units, e.g, fewer than 20.

Suitable polymers and oligomers within the scope of the invention include, but are not limited to, polyacrylates, polyvinylbenzoates, polyvinyl sulfate, polyvinyl sulfonates including sulfonated styrene, polybisphenol carbonates, polybenzimidizoles, polypyridine, sulfonated polyethylene terephthalate. Other suitable polymers include polyvinyl alcohol, polyethylene glycol, polypropylene glycol, and the like.

Figure 4:
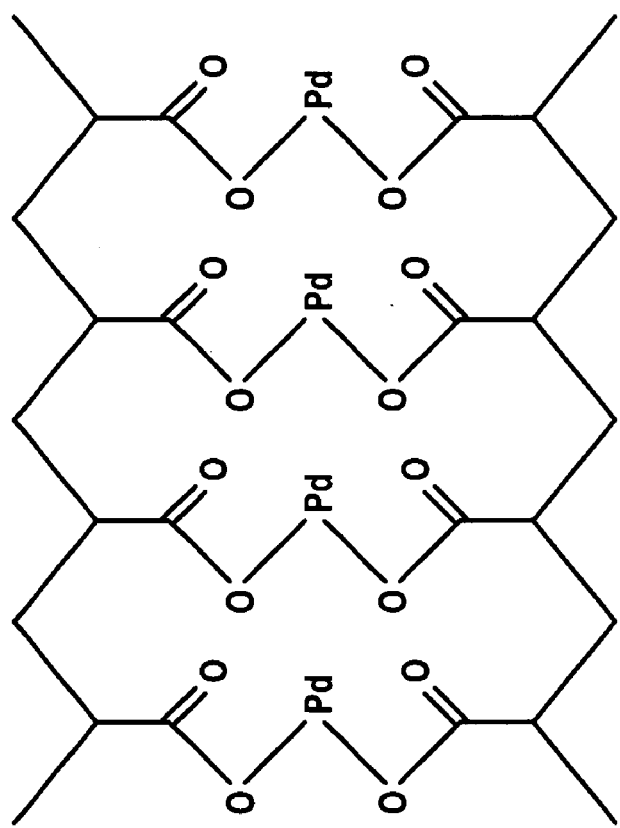
FIG. 4 is a schematic diagram of the chemical structure of an exemplary intermediate catalyst complex of the present invention.

In the intermediate catalyst complex, the catalyst atoms, more precisely ions of the catalyst atoms, are in an arranged formation corresponding to the functional groups located on the polymer, oligomer or molecular backbones. For example, as illustrated in FIG. 4, the catalyst atoms may be complexed on one side to a first polymer or oligomer chain, more particularly by the functional groups along the length of the control agent molecule, and on a second side by a second polymer chain. In this way the catalyst atoms can be considered to be disposed in a controlled arrangement corresponding to the functional groups along the backbones of the first and second control agent molecules while in solution or a colloidal suspension even before they are deposited or bonded to a support.

It may be advantageous to provide an excess of the control agent so as to provide an excess of functional groups relative to the number of catalyst atoms. Including an excess of functional groups helps ensure that all or substantially all of the catalyst atoms are complexed by the control agent, which is particularly beneficial in case where the catalyst material is expensive, such as in the case of noble metals. Providing an excess of control agent also helps ensure the availability of functional groups for bonding the catalyst complex to the support. It is also believed that employing an excess of functional groups helps yield a supported catalyst in which the catalyst particles are more evenly dispersed. Excess control agent molecules are believed to intervene and maintain spacing between control agent molecules that form the catalyst complex in order to better distribute the individual catalyst complex clusters over the support surface rather than allowing them to clump or agglomerate together.

It has now been found that the tendency to form catalyst particles having a coordination number of 2 on the surface is related to the percentage of straight-chained control agent molecules relative to branched molecules. Increasing the concentration of straight-chained molecules increases the likelihood of forming catalyst crystals or particles that have a coordination number of 2 on the top or outer layer of catalyst atoms. This, in turn, increases the specificity of the desired catalytic reaction.

The term "straight-chained" denotes a polymer, oligomer, or organic compound that includes a backbone that does not have any branch points. Thus, it is in reference to the backbone that determines whether a particular control agent molecule is straight-chained or not. If the backbone of a control agent molecule is linear without any branch points, the molecule is "straight-chained". If the backbone includes branch points such that the backbone is not linear but is branched, the molecule is "branched".

The term "backbone" denotes the portion of the control agent molecule to which functional groups that are useful in complexing catalyst atoms are attached. Backbones that include stray groups or chains to which no complexing functional groups are attached may therefore still be considered to be straight-chained. Thus, it may be more precise to determine whether a particular polymer, oligomer or organic compound is straight-chained or branched by determining the arrangement of functional groups along the backbone rather than merely determining whether the backbone includes branch points.

In view of the foregoing, typical control agents according to the invention are those in which at least about 50% of the control agent molecules are straight-chained. Preferably, at least about 60% of the control agent molecules are straight-chained, more preferably at least about 75% of the control agent molecules are straight-chained, even more preferably at least about 90% of the control agent molecules are straight-chained, and most preferably, at least about 95% of the control agent molecules are straight-chained. The tendency of the control agent to yield catalyst particles in which the top or outer layer of catalyst atoms have a coordination number of 2 is maximized where about 100% of the control agent molecules are straight-chained.

As a corollary to the foregoing, the control agent generally includes less than about 50% branched molecules, preferably less than about 40% branched molecules, more preferably less than about 25% branched molecules, even more preferably less than about 10% branched molecules, and most preferably less than about 5% branched molecules. The tendency of the control agent to yield catalyst particles in which the top or outer layer of catalyst atoms have a coordination number of 2 is maximized where about 0% of the molecules are branched.

In some cases, the tendency of a polymer, oligomer or organic molecule to be branched decreases with decreasing molecular weight, more specifically, with a decreased number of repeating units. Thus, reducing the molecular weight, or more precisedly the number of repeating units, of a polymer, oligomer or organic molecule increases its tendency to be straight-chained. An example of a control polymer or oligomer that is more straight-chained with reduced molecular weight (i.e., fewer repeating units) is polyacrylic acid. Decreasing the molecular weight of polyacrylic acid decreases the number of repeating units, which, in turn statistically reduces the likelihood that a particular polyacrylic acid polymer or oligomer molecule will be branched.

For example, polyacrylic acid having a molecular weight of 1200, which has approximately 16 repeating units and yields catalyst particles having surface diameter of about 3–5 nm, is believed to have minimal branching. Based on current data, it is believed that at least about 80–90% of the molecules comprising polyacrylic acid having a molecular weight of 1200 are straight-chained. This is consistent with teachings relating to polymer branching found within, Hiemenz, Polymer Chemistry: The Basic Concepts (1984), p. 394, which states that, for high conversions of polyethylene, "side chains may occur as often as once every 15 backbone repeat units on the average." Thus, at least with respect to polyethylene and similar polymers, oligomers having fewer than 15 units might be expected to be entirely straight-chained with no branch points. Hence, polyacrylic acid oligomers of 16 units would be expected to have only small incidence of branching, if any, particularly if reaction conditions are more carefully controlled to reduce the incidence of branching.

Once it is understood that increasing the concentration of straight-chained control agent molecules increases the likelihood of forming a catalyst particle in which the top or outer layer of catalyst atoms have a coordination number of 2, one of skill in the art will be able to select an appropriate control agent having an appropriate concentration of straight-chained versus branched control agent molecules. Thus, even larger molecular weight polymers may be carefully engineered to have straight chains and thus may have usefulness in the compositions and methods of the present invention. Most of the structural aspects of the catalytic particles such as their size, shape, formation, and dispersion can be designed based on selecting one or more control agents or templating agents having a particular size and/or percentage of straight molecules versus branched molecules.

In addition to the characteristics of the control agent, a second factor which can control the selective formation of the desired controlled coordination structures of the invention is the molar ratio of the control agent to the catalyst atoms in the intermediate precursor composition. It is within the scope of the invention to include a molar ratio of control agent molecules to catalyst atoms in a range of about 1:0.1 to about 1:10. Preferably, the molar ratio of control agent molecules to catalyst atoms is in a range of about 1:0.2 to about 1:5.

In some cases, a more useful measurement is the molar ratio between control agent functional groups and catalyst atoms. For example, in the case of a divalent catalyst metal ion, such as $Pd^{+2}$, two molar equivalents of a monovalent functional group, such as carboxylate ion, would be necessary to provide the theoretical stoichiometric ratio. It may be desirable to provide an excess of control agent functional groups to (1) ensure that all or substantially all of the catalyst atoms are complexed, (2) bond the catalyst complex to the support, and (3) help keep the catalyst particles segregated so that they do not clump or agglomerate together. In general, it will be preferable to include a molar ratio of control agent functional groups to catalyst atoms in a range of about 0.5:1 to about 40:1, more preferably in a range of about 1:1 to about 35:1, and most preferably in a range of about 3:1 to about 30:1.

It is believed that the foregoing ratios play a factor because the number of control agent molecules that surround each catalyst atom determines the rate and orientation in which the catalyst particles are formed. It should be noted that the most preferred ratio of control agent to catalyst atoms will depend on the type of control agent used, the type of catalyst atoms used, and the molecular weight of the control agent. For control agents with higher molecular weights, a lower ratio of control agent to catalytic component is generally preferred, compared to cases where control agents have lower molecular weights. It is believed that this derives from the fact that control agents will often have multiple points of interaction and complex formation with dissolved catalyst components. Therefore, a higher molecular weight control agent with more functional groups along the backbone of the control agent molecules can complex with more catalyst atoms, and a lower molar ratio of control agent to catalyst component is preferred. The converse is true for a control agent with a lower molecular weight, where a higher molar ratio of control agent to catalyst component will therefore be preferred.

When a support material is added to an intermediate precursor composition, the control agent acts to uniformly disperse the complexed catalyst atoms onto the support material. Because the catalyst atoms are dispersed, the particles resulting from the coalescing of the catalyst atoms are also uniformly dispersed because the particles will form in the most thermodynamically stable formations. This results in a more active catalyst since uniformly dispersing the catalytic particles allows more reactive sites to be exposed.

Finally, depending on how the supported catalyst is formed, another aspect of the control or templating agent is that it may act to anchor the catalyst particles to the support. That is, during and after formation of the catalyst particles, the control agent may act as an anchoring agent to secure the particle to the substrate material. Preferably, the substrate has a plurality of hydroxyl or other functional groups on the surface thereof which are able to chemically bond to one or more functional groups of the control agent, such as by a condensation reaction. One or more additional functional groups of the control agent are also bonded to one or more atoms within the catalyst particle, thereby anchoring the catalyst particle to the substrate. Chemically bonding the catalyst particle to the substrate surface through the control agent helps to keep the catalyst active over time by reducing the tendency of the catalyst particles to agglomerate.

B. Solvents and Carriers

A solvent or carrier may be used as a vehicle for the catalyst atoms (typically in the form of an ionic salt) and/or the control agent. The solvent used to make inventive precursor compositions may be an organic solvent, water or a combination thereof. Preferred solvents are liquids with sufficient polarity to dissolve the metal salts which are preferred means of introducing the catalytic components to the precursor solution. These preferred solvents include water, methanol, ethanol, normal and isopropanol, acetonitrile, acetone, tetrahydrofuran, ethylene glycol, dimethylformamide, dimethylsulfoxide, methylene chloride, and the like, including mixtures thereof.

The solvent for the precursor solution may be neat solvent, but it is preferable to use an acidic solution, as acids aid in the dissolution of the precursor compounds. The solution may be acidified with any suitable acid, including organic and inorganic acids. Preferred acids are mineral acids such as sulfuric, phosphoric, hydrochloric, and the like, or combinations thereof. While it is possible to use an acid in a wide range of concentrations in the precursor solution, it is generally only necessary to use relatively dilute solutions to accomplish the desired solubility enhancement. Moreover, concentrated acid solutions may present added hazard and expense. Thus, dilute acid solutions are currently preferred.

C. Supports and Support Materials

The catalyst particles of the invention may be dispersed without a solid support material. For example, they may be dispersed in a solution, suspension, slurry, emulsion, or other liquid medium. The catalyst particles may also be isolated, for example as a fine powder. However, growing the catalyst particles on a support appears to greatly improve the ability to obtain catalyst particles having the desired controlled coordination structure. Without the support, it may not be possible to form catalyst particles and then expose the desired crystal face to yield the desired face exposition.

Accordingly, the preferred mode of the invention is for the catalyst particles to be deposited on and supported by a solid support material. Because the term "intermediate precursor composition" may include whatever components are present prior to formation of the final supported reactive catalyst, it may also include the support. Once a portion of the control agent has been removed to expose a portion of the catalyst particles so as to make them catalytically active, the support then becomes part of the final supported active catalyst.

The solid support material may, preferably, be a particle itself or the solid support may be an essentially continuous solid surface such as a film, fiber or rod. The solid support material may be organic or inorganic. It may be chemically inert in the chemical reaction environment or the solid support itself may serve a catalytic function complementary to the function of the catalyst particles of the present invention. The support material may also play a chemical role in the catalysis process, for example by modifying the structural, electronic, or chemical properties of the dispersed catalytic particles, or by contributing additional catalytically active sites which directly participate in the overall catalytic process.

The use of a larger quantity of a solid material to serve as a support for a lesser quantity of dispersed catalytic particles is a common strategy in catalysis and affords a number of known advantages. These advantages include, but are not limited to, more efficient and economical use of the catalytic active component, greater stability of small catalytic particles, and separation and spacing of the catalytic particles to prevent inter-particle effects.

Any solid support material known to those skilled in the art as useful catalytic supports may be used as supports for the dispersed controlled coordination structure catalytic particles of this invention. These supports may be in a variety of physical forms. They may be either porous or non-porous. They may be 3-dimensional structures such as a powder, granule, tablet, extrudates, or other 3-dimensional structure. Other 3-dimensional structures include so-called "structured" materials, such as structured packing, which may be in the form of numerous individual pieces of controlled shape such as rings, saddles, or other shapes, or may be in the form of larger structures, examples of which include structured packings commonly used for distillation and other phase contacting equipment which involve the use of regular geometric arrangements of convoluted surfaces. Supports may also be in the form of mainly spherical particles (i.e., beads). Supports may also be in the form of 2-dimensional structures such as films, membranes, coatings, or other mainly 2-dimensional structures.

A variety of material components, alone or in combination, can comprise the support. One important class of support materials which is preferred for some applications is porous inorganic materials. These include, but are not limited to, alumina, silica, titania, kieselguhr, diatomaceous earth, bentonite, clay, zirconia, magnesia, as well as the oxides of various other metals, alone or in combination. They also include the class of porous solids collectively known as zeolites, natural or synthetic, which have ordered porous structures.

Another useful class of supports preferred for some applications include carbon-based materials, such as carbon black, activated carbon, graphite, fluoridated carbon, and the like.

Another useful class of support materials include organic solids, such as polymers. These can include polymer membranes such as those used for the electrodes of fuel cells. They can also include polymeric or resinous beads, such as those commonly used as ion exchange resins and polymeric adsorbents.

Another useful class of support materials include metals and metal alloys.

In the case when the catalyst particles of the subject invention are attached to a support as part of a final supported reactive catalyst, the catalyst particles may be deposited in a wide range of loadings on the support material, ranging from 0.01% to 75% by weight of the total weight of the supported reactive catalyst, with a preferred range of 0.1% to 25% by total weight of the supported reactive catalyst. However, when the primary catalytic component of the dispersed particles comprises one or more noble metals, it is preferred that the loading of noble metal be relatively low so as to economize the expensive active metal and prevent interparticle interactions, agglomeration, sintering, and other undesirable phenomena. In these cases the preferred catalyst load will be within a range from about 0.01% to about 10% by weight of the supported reactive catalyst, more preferably in a range of about 0.1% to about 5% by weight of the supported reactive catalyst. It should be noted that even when noble metals are used, other components may also be added to the catalyst particles, and may be added at higher loadings, such that the total weight of catalyst particles can comprise as much as 75% of the total weight of the supported reactive catalyst.

In the case where porous solids are used as the support material, it is preferred that the surface area of the support be at least 20 m²/g, and more preferably more than 50 m²/g.

IV. Methods of Making and Using Intermediate Precursor Compositions and Supported Reactive Catalysts The process for manufacturing intermediate precursor compositions and supported reactive catalysts therefrom can be broadly summarized as follows. First, one or more types of catalyst atoms and one or more types of control agents are selected. Second, the catalyst atoms and control agent are reacted or combined together to form a catalyst complex, generally by first dissolving the catalyst atoms and control agent in an appropriate solvent or carrier in the form of ionic salts and then allowing the salts to recombine as the catalyst complex so as to form a solution or colloidal suspension. Third, the catalyst complex is applied to a support material to form an intermediate supported catalyst complex. Fourth, a portion of the control agent is removed to expose at least the top or outer layer of catalyst atoms so as to form active catalyst particles, while a portion of the control agent remains at the interface between the support and catalyst particles to assist in anchoring the catalyst particles to the support. At some point along the way, the control agent may form a chemical bond with the support.

Figure 5:
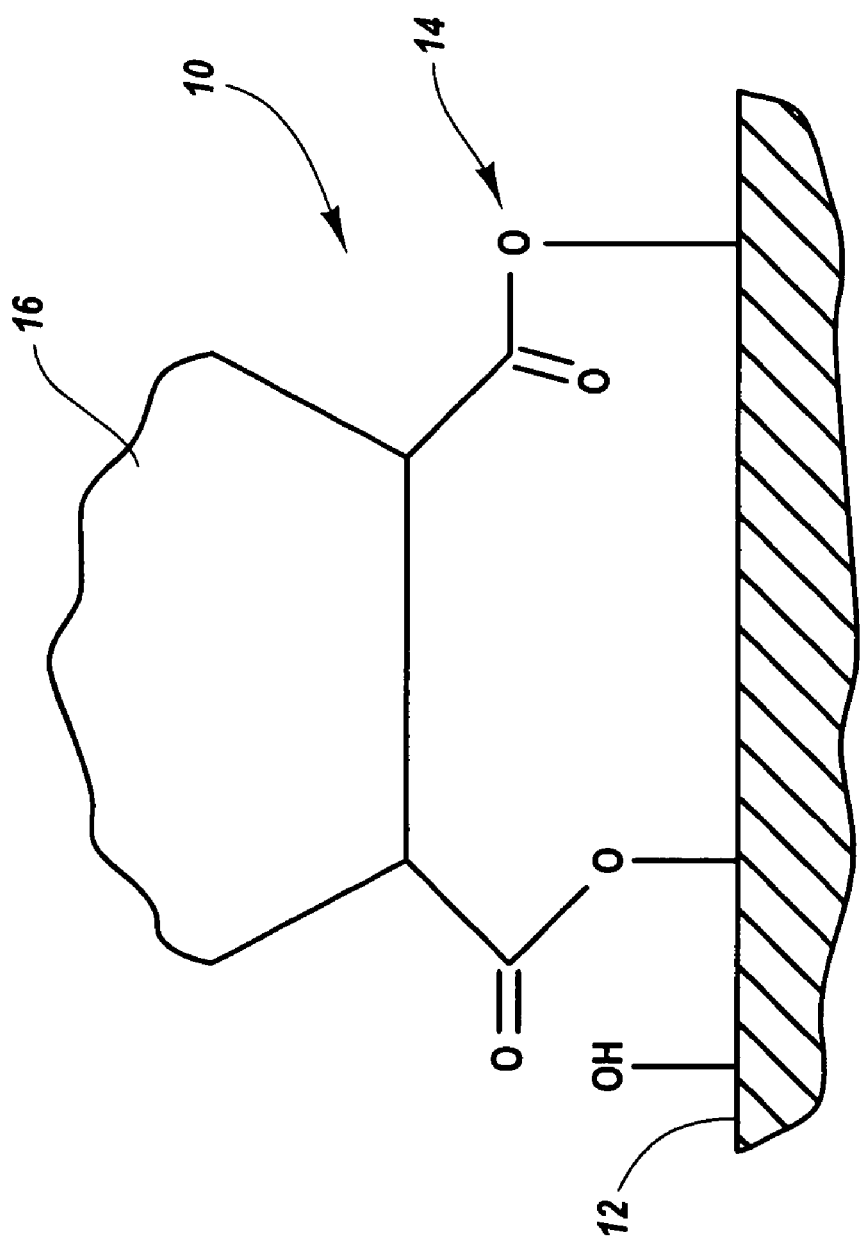
FIG. 5 schematically illustrates a catalyst particle chemically bonded to a support by an anchoring agent.

An exemplary catalyst complex between a catalyst metal (i.e., palladium) and a control agent is schematically illustrated in FIG. 4. Removing a portion of the control agent yields a catalyst particle that may be chemically anchored to the support material by the remaining portion of the control agent, as schematically illustrated in FIG. 5. As shown therein, a supported catalyst 10 includes a support 12, which initially includes hydroxyl groups on a surface thereof, an anchoring agent 14 chemically bonded to the hydroxyl groups of the support 12 by a condensation reaction, and a catalyst particle 16 bonded or attached in some manner (not shown) to the anchoring agent. When the control agent is removed by hydrogenation or other processes disclosed below, it is theorized that the catalyst atoms collapse or coalesce together to form structured crystals or particles.

In view of the foregoing, it is apparent that every step before the final supported reactive catalyst is formed involves the formation or use of an intermediate precursor composition in one form or another. In one aspect of the invention, the "intermediate precursor composition" may be considered to be the catalyst complex comprising the catalyst atoms and control agent, exclusive of the surrounding solvent or carrier. Indeed, it is within the scope of the invention to create a catalyst complex in solution, or as a colloid or suspension, and then remove the solvent or carrier so as to yield a dried catalyst complex that can be later added to an appropriate solvent or carrier to reconstitute a solution or colloidal suspension containing the catalyst complex. Thus, in another aspect of the invention, an "intermediate precursor composition" according to the invention may include one or more different solvents or carriers into which the catalyst complex may be dispersed. The catalyst complex may be applied, or even bonded, to a support prior to removing a portion of the control agent so as to expose a portion of the catalyst atoms to reveal the desired controlled coordination structure. Thus, an "intermediate precursor composition" according to the invention may include the catalyst complex and a support, with or without a solvent or carrier. Accordingly, any composition that includes a catalyst complex comprising catalyst atoms complexed with a control agent in an ordered array (as schematically illustrated in FIG. 4) may be considered to comprise an "intermediate precursor composition".

Exemplary methods for making catalysts according to the invention include providing one or more types of catalyst atoms in solution (e.g., in the form of an ionic salt), providing a control agent in solution (e.g., in the form of a carboxylic acid salt), and reacting the catalyst atoms with the control agent to form a precursor composition comprising a complex of the catalytic component and the control agent. The fine dispersion of the catalytic component within an appropriate solvent or carrier by the control agent may be colloidal.

The catalyst atoms can be provided in any form so as to be soluble or dispersible in the solvent or carrier that is used to form the catalyst complex. In the case where the catalyst atoms comprise one or more metals, salts of these metals can be formed that are readily soluble in the solvent or carrier. In the case where the catalyst atoms include noble metals, it is advantageous to use noble metal chlorides and nitrates, since chlorides and nitrate of noble metals are more readily soluble than other salts. Chlorides and nitrates of other metal catalyst atoms, such as base transition metals and rare earth metals may likewise be used since chlorides and nitrates are typically more soluble than other types of salts.

These catalyst atoms can be added to the solvent or carrier singly or in combination to provide final catalyst particles that comprise mixtures of various types of catalyst atoms. For example, a bimetallic palladium/platinum catalyst can be formed by first forming a precursor solution in which is dissolved a palladium salt, such as palladium chloride, and a platinum salt, such as chloroplatinic acid. In general, the composition of the final catalyst will be determined by the types of catalyst atoms added to the precursor solution. Therefore, control of the amounts of precursor salts added to the solution provides a convenient method to control the relative concentrations of different types of catalyst atoms in the final catalyst particles.

The control agent is added to the solvent or carrier in a manner so as to facilitate association with the catalyst atoms in order to form the catalyst complex. Some control agents may themselves be soluble in the solvent or carrier. In the case of control agents that include carboxylic acid groups, it may be advantageous to form a metal salt of the acids (e.g., an alkali or alkaline earth metal salt). For example, polyacrylic acid can be provided as a sodium polyacrylate salt, which is both readily soluble in aqueous solvent systems and able to react with catalyst metal salts to form a catalyst metal-polyacrylate complex, which may be soluble or which may form a colloidal suspension within the solvent or carrier.

One aspect of the invention is that very small catalytic particles can be controllably formed (e.g., less than about 100 nm, preferably less than about 10 nm, more preferably less than 6 nm, and most preferably less than 4 nm). The inventors believe that the use of an excess quantity of the control agent plays a factor in determining the size of the resulting catalyst particles.

In the case where the catalyst particles of the invention are to be formed on a solid support material, the intermediate precursor composition comprising the catalyst complex between the catalyst atoms and control agent is physically contacted with the solid support. Contacting the catalyst complex with the solid support is typically accomplished by means of an appropriate solvent or carrier within the intermediate precursor composition in order to apply or impregnate the catalyst complex onto the support surface.

Depending on the physical form of the solid support, the process of contacting or applying the catalyst complex to the support may be accomplished by a variety of methods. For example, the support may be submerged or dipped into a solution or suspension comprising a solvent or carrier and the catalyst complex. Alternatively, the solution or suspension may be sprayed, poured, painted, or otherwise applied to the support. Thereafter, the solvent or carrier is removed, optionally in connection with a reaction step that causes the control agent to become chemically bonded or adhered to the support. This yields a supported catalyst complex in which the active catalyst atoms are arranged in a desired fashion, both in terms of their special orientation resulting from the control agent and the arrangement of the control agent on the support.

In order to expose at least a portion of catalyst atoms and yield an active supported catalyst, a portion of the control agent is removed, such as by reduction (e.g., hydrogenation) or oxidation. Hydrogen is the preferred reducing agent. Instead of or in addition to using hydrogen as the reducing agent, a variety of other reducing agents may be used, including lithium aluminum hydride, sodium hydride, sodium borohydride, sodium bisulfite, sodium thiosulfate, hydroquinone, methanol, and aldehydes, and the like. The reduction process may be conducted at a temperature between 20° C. and 500° C., and preferably between 100° C. and 400° C. It should be pointed out that oxidation is more suitable when the catalyst atoms do not include noble metals, since noble metal catalysts might catalyze the oxidation of the entire control agent, leaving none for anchoring. Oxidation is more suitable (e.g., at a maximum temperature of 150° C.), for example, in the case where the catalyst atoms comprise transition metals and the support is non-combustible (e.g., silica or alumina rather than carbon black, graphite or polymer membranes).

While not to be construed as limiting the scope of the invention, the following explanation can be offered for the usefulness of the reduction step. It is believed that as the catalyst particle is forming, much of the active surface of the catalyst particles is covered by the control agent molecules. The reduction step serves to modify this surface structure, revealing the desired controlled coordination structure of the catalyst particles. This step may remove the control agent molecules, or relocate or reorient those molecules on the catalyst surface, or some combination thereof.

The process of removing the control agent to expose the catalyst atoms is carefully controlled to ensure that enough of the control agent remains so as to reliably anchor the catalyst particles to the support. Thus, at least that portion of the control agent interposed between the support and the bottom surface of the catalyst particles facing the support is advantageously left intact. It is theorized that during removal of the control agent (by hydrogenation/reduction, reflux/boiling, or other process), the control agent on the outer surfaces of the catalyst particle is more easily removed than the control agent bonded between the support and the catalyst particle. Thus, the remaining control agent disposed between the support and the catalytic particle acts to anchor the catalytic particle to the support. This results in catalyst particles that have enhanced stability with respect to surface migration, agglomeration, and sintering. On the other hand, removing the control agent to the extent that little or none of it remains to anchor the catalyst particles to the support has been found to reduce the long-term stability of the supported catalyst.

The resulting supported reactive catalyst can be optionally heat-treated to further activate the catalyst. It has been found that, in some cases, subjecting the supported reactive catalyst to a heat treatment process before initially using the supported catalyst causes the catalyst to be more active initially. The step of heat treating the supported catalyst may be referred to as "calcining" because it may act to volatilize certain components within the supported catalyst. However, it is not carried out at temperatures high enough to char or destroy the anchoring agent. The heat treatment process may be carried in inert, oxidizing, or reducing atmospheres, but preferably in an inert atmosphere. Where the supported catalyst is subjected to a heat treatment process, the process is preferably carried out at a temperature in a range of about 50° C. to about 300° C., more preferably in a range of about 100° C. to about 250° C., and most preferably in a range of about 125° C. to about 200° C. The duration of the heat treatment process is preferably in a range of about 30 minutes to about 12 hours, more preferably in a range of about 1 hour to about 5 hours.

As discussed above, the providing a catalyst having a controlled coordination number of 2 for atoms on the top or outer layer of reactive catalyst atoms is useful for a variety of chemical processes. One of these involves the direct reaction of hydrogen and oxygen to form hydrogen peroxide. Accordingly, this aspect of the invention is further described with the aid of the following examples, which should not be construed as limiting the scope of the invention.

EXAMPLE 1

Preparation of Pd/Pt Controlled Coordination Catalyst on Carbon Support

This example describes the preparation of a noble metal catalyst on a carbon support having a top or outer layer of noble metal atoms with controlled coordination of 2. The active noble metal constituent included a mixture of palladium and platinum. The catalyst support was carbon black.

A first solution was prepared by dissolving 1.333 g of palladium chloride in 1000 ml of an acidic aqueous solution that included 0.15% hydrochloric acid. A second solution was prepared by dissolving 15 g of a 45% sodium polyacrylate solution in 100 ml of water. The sodium polyacrylate had a molecular weight of 1200. This batch of sodium polyacrylate was believed to include about 80–90% straight-chained molecules. A third solution was then prepared by dissolving 0.2614 g of platinum chloride in 1000 ml of water. Thereafter, 300 ml of the first solution, 40 ml of the second solution, and 48 ml of the third solution were mixed together. The combined solution was then diluted up to a total volume of 4000 ml with water.

The diluted combined solution was then purged with a continuous flow of nitrogen for 1 hour, and then reduced by a continuous flow of hydrogen for 20 minutes. The combined solution mixture was designated the "catalyst precursor solution".

The catalyst precursor solution was then mixed with 24 g of carbon black having a surface area of 200 $m^2/g$. The precursor solution/carbon black mixture was mixed for 17 hours to ensure thorough impregnation of the support by the catalyst precursor solution. The impregnated carbon black was then dried overnight to yield an intermediate precursor composition comprising a catalyst complex of palladium, platinum and polyacrylate applied to the carbon black support.

After drying, the intermediate precursor composition was reduced under a continuous hydrogen flow at 300° C. for 17 hours. After this process was complete, an active controlled coordination catalyst was obtained that is an example of a reactive supported catalyst according to the invention. The reactive supported catalyst had a noble metal loading of 0.7 wt %.

Figure 6:
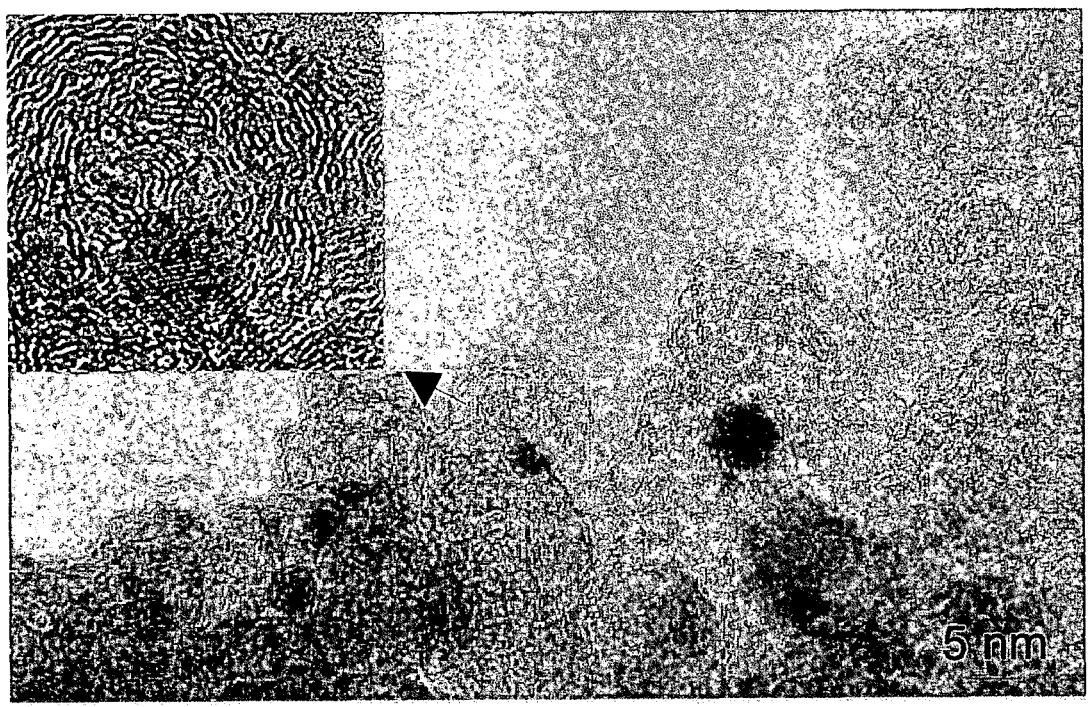
FIG. 6 is a high resolution TEM of a supported Pd—Pt/C catalyst according to the invention showing the ordered arrangement of the noble metal catalyst atoms.

The presence of the desired controlled coordination structure was established by use of high resolution transmission electron microscopy, as shown in FIG. 6. In this micrograph, the carbon support material is visible as the lighter colored matrix, while, the noble metal crystallites are visible as darker colored spots. The low magnification panels show a uniform dispersion of small (<5 nm) noble metal crystallites. While a lack of contrast between support and noble metal particles somewhat hinders the interpretation of the image, the controlled coordination structure is evident in the magnified image of a single noble metal particle shown in the upper left panel of FIG. 6. A series of lines visible on the surface of the particle are at atomic dimensions, and represent a direct image of the atomic structure of the surface. The structure is direct evidence of surface atoms that are coordinated with only two nearest neighbor top or outer layer atoms. All other top or outer layer atoms are at greater spacing.

Testing of the supported catalyst, including IR spectroscopy, indicated that some of the control agent appeared to remain even after the reduction step. In particular, IR spectroscopy showed that a substantial portion of the hydroxyl groups originally present on the support were no longer present, suggesting that they had reacted with the control agent. IR spectroscopy also indicated the presence of C—H groups, suggesting that a portion of the control agent remained after hydrogenation. The fact that the catalyst particles were much less mobile compared to supported catalysts that did not include any control agent suggested that the remaining control agent acted to anchor the catalyst particles to the support.

EXAMPLE 2

Preparation of Pd/Pt Controlled Coordination Catalyst on TS-1 Support

This example describes the preparation of a noble metal catalyst on a zeolitic support having top or outer layer noble metal atoms with controlled coordination of 2. The active noble metal constituent included a mixture of palladium and platinum. The catalyst support was titanium silicalite-1 (TS-1).

A first solution was prepared by dissolving 1.3339 g of palladium chloride in 1000 ml of an acidic aqueous solution that included 0.15% hydrochloric acid. A second solution was prepared by dissolving 15 g of a 45% sodium polyacrylate solution in 100 ml of water. The sodium polyacrylate had a molecular weight of 1200. A third solution was then prepared by dissolving 0.2614 g of platinum chloride in 1000 ml of water. Thereafter, 75 ml of the first solution, 10 ml of the second solution, and 12 ml of the third solution were mixed together. The combined solution was then diluted with water up to a total volume of 500 ml.

The diluted combined solution was then purged with a continuous flow of nitrogen for 1 hour, and then reduced by a continuous flow of hydrogen for 20 minutes to form the catalyst precursor solution.

The catalyst precursor solution was then mixed with 6 g of titanium silicalite-1 (TS-1) having a surface area of 370 $m^2/g$. The precursor solution/TS-1 mixture was mixed for 17 hours to ensure thorough impregnation of the support by the precursor solution. The impregnated TS-1 was then dried overnight. After drying, the impregnated TS-1 was reduced under continuous hydrogen flow at 300° C. for 17 hours. After reduction, an active controlled coordination catalyst was obtained with a noble metal loading of 0.8 wt %.

Figure 7:
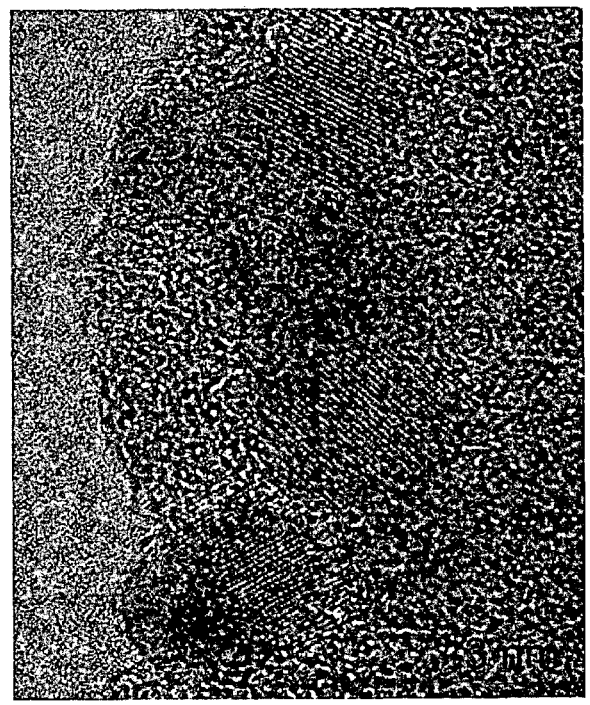
FIG. 7 is a high resolution TEM of a supported Pd—Pt/TS1 catalyst according to the invention showing the ordered arrangement of the noble metal catalyst atoms on a TS1 catalyst support.

Again, the presence of the desired controlled coordination surface structure was confirmed by use of high resolution transmission electron microscopy. In a TEM image shown in FIG. 7, the noble metal particles are readily visible as darker patches against the lighter support background. Somewhat better imaging contrast is achieved compared to Example 1, so the controlled coordination structure is more easily visible in the noble metal particles. The particle surfaces show lines at the atomic scale, indicating that individual surface atoms are only coordinated with two adjacent nearest neighbor atoms in the top or outer layer.

The supported reactive catalysts disclosed above are useful in various reactions including formation of hydrogen peroxide as a raw material or as an intermediate in the oxidation of organic molecules, direct oxidation of organic molecules, hydrogenation, reduction, dehydrogenation, and, potentially, to make fuel cells, which reactions are summarized below. These reactions can be further optimized by optimizing solvents, pH, and other reaction conditions.

The hydrogen peroxide made using catalysts of this invention can be recovered as a product in selectivities of 95% to 100%. Alternately, the hydrogen peroxide produced can be used as an intermediate for the production of other chemical products. Examples of useful chemical reactions which may be conducted using the hydrogen peroxide intermediate are the conversion of olefins such as propylene to epoxides including propylene oxide; the conversion of aromatics such as benzene to hydroxylated aromatics including phenol; and the conversion of acids such as acetic acid into peracids including peracetic acid.

The hydrogen peroxide intermediate may be used ex situ or in situ. By ex situ is meant the case where the hydrogen peroxide intermediate is withdrawn from the hydrogen peroxide synthesis reactor as an intermediate product, and then passed to downstream processing steps where it utilized as a reactant in the formation of the desired chemical product. By in situ is meant the case where the hydrogen peroxide intermediate formed by the catalyst of this invention is converted, immediately upon formation and in the same chemical reactor, in a second chemical reaction to form the desired product. This in situ conversion may be accomplished using a second, physically separate catalyst for the second step reaction. Alternatively, the second-step catalyst may be physically integrated with the catalyst of the invention into a dual-functional catalyst by using the second-step catalyst as the substrate for the deposition of the dispersed controlled coordination catalyst particles of this invention. In yet another alternative, the second step reaction may be non-catalytic.

EXAMPLE 3

Batch Synthesis of Hydrogen Peroxide Using Controlled Coordination Catalyst 0.2 g of supported catalyst prepared according to Example 1 was charged to a semi-batch stirred tank reactor with nominal liquid volume of 200 ml. 200 ml of liquid solution consisting of water with 1 wt % $H_2SO_4$ and 5 ppmw NaBr was also charged to the reactor. A gas feed consisting of 3 vol % hydrogen, 20 vol % oxygen, and 77 vol % nitrogen was fed continuously to the reactor at a rate of 1000 sccm. Unreacted gases were continuously withdrawn from the reactor. The reactor was maintained at a temperature of 45° C. and a pressure of 1400 psig. A mechanical stirrer was used to agitate the reaction medium.

Continuous flow of gas was maintained for a period of 3 hours. At the end of the 3 hour run, the gas feed was stopped, and the final liquid removed from the reactor. Based on gas analysis, the overall average hydrogen conversion was found to be 33%. Liquid analysis showed a final hydrogen peroxide concentration of 4.8 wt %. The hydrogen peroxide selectivity with respect to hydrogen converted was found to be 100%.

EXAMPLE 4

Continuous Synthesis of Hydrogen Peroxide Using Controlled Coordination Catalyst 0.837 g of supported catalyst prepared according to Example 1 was charged to a continuous stirred tank reactor (CSTR) with nominal liquid volume of 200 ml. A liquid solution consisting of methanol with 1 wt % $H_2SO_4$ and 5 ppmw NaBr was continuously fed to the reactor at a rate of 100 cc/hr. A gas feed consisting of 3 vol % hydrogen and 97 vol % oxygen was fed to the reactor at a rate of 5200 sccm. The reactor was maintained at a temperature of 35° C. and a pressure of 1400 psig. A mechanical stirrer was used to agitate the reaction medium. An internal filter was attached to the reactor outlet connection to allow gas and liquid products to be continuously withdrawn from the reactor while maintaining the catalyst within the reactor.

The reactor was maintained in this continuous operation for a period of 150 hours. After allowing for an initial lineout period of about 30 hours, a period of steady-state operation was observed for a period of 120 hours. During this period, the average conversion of hydrogen was found to be 42%. The average selectivity of hydrogen peroxide formation, based on hydrogen converted, was found to be 95%. The average liquid product hydrogen peroxide concentration was found to be 6.8 wt %.

EXAMPLES 5–12

Heat Treatment of Supported Catalyst to Increase Catalytic Activity/Selectivity

Eight catalyst samples were prepared. The following procedure was common to all eight catalysts. A palladium salt solution was prepared by mixing 1.3339 g $PdCl_2$ with 4 ml HCl and 996 ml de-ionized water. The resulting solution contained 0.0799 wt. % ($7.511 \times 10^{-3}$ M) palladium. A platinum salt solution was prepared by mixing 0.2614 g $H_2PtCl_6$ with 1000 ml de-ionized water. The resulting solution contained 0.010 wt. % ($5.126 \times 10^{-4}$ M) platinum. A templating agent solution was prepared by diluting 16 g of 45 wt. % polyacrylic acid solution (MW approximately 1200 Daltons) to a total weight of 100 g with de-ionized water. The resulting solution contained 6.75 wt. % polyacrylic acid.

In order to prepare 48 grams of 1% Pd+0.02% Pt/C catalyst, 600 ml of the palladium salt solution was mixed with 96 ml of the platinum salt solution and 80 ml of the polyacrylic acid solution. The resulting mixture was diluted to 8000 ml with de-ionized water. The diluted solution was purged with 100 ml/min $N_2$ for 1 hour. The $N_2$ was then replaced by 100 ml/min $H_2$ for 20 minutes. 48 g of carbon black (BP-700 from Cabot) was added to the diluted solution. The resulting mixture was then boiled to remove most of the liquid, followed by drying to obtain a dry solid.

The dry solid was then reduced as follows:
1. Purged with 100 ml/min $N_2$ for 30 minutes;
2. Switched to 100 ml/min $H_2$;
3. Temperature ramped from 30° C. to 90° C. over 30 minutes;
4. Temperature held at 90° C. for 2 hours;
5. Temperature ramped from 90° C. to 300° C. over 2 hours;
6. Temperature held at 300° C. for 17 hours.

Different catalyst samples were then subjected to a heat treatment process under an inert $N_2$ atmosphere at various temperatures for 3 hours according to the following table:

| Example | Heat Treatment |
| --- | --- |
| 5 | None |
| 6 | 100° C. |
| 7 | 125° C. |
| 8 | 150° C. |
| 9 | 175° C. |
| 10 | 200° C. |
| 11 | 225° C. |
| 12 | 250° C. |

The supported catalysts made according of Examples 5–12 were used to conduct a semi-batch synthesis of hydrogen peroxide from hydrogen and oxygen in a stirred reactor. For each batch, 75 g of liquid feed mixture was used consisting of water with 1% $H_2SO_4$ and pp, NaBr. 0.25 g of catalyst was added according to the table below. The synthesis reaction was conducted at 45° C. and 1000 psig with a continuous feed of 1000 sccm of gas containing 3.15% hydrogen in air. The outlet gas was analyzed by CG to determine the extent of hydrogen conversion. The reaction was run for 2 hours, at which time the feed gas was stopped and the liquid product removed and analyzed for hydrogen peroxide content. The results were as follows, where the hydrogen peroxide selectivity is calculated as moles of hydrogen peroxide produced per moles of hydrogen consumed.

| Example | $H_2O_2$ Conc. (wt %) | Hydrogen Conversion (%) | $H_2O_2$ Selectivity (%) |
| --- | --- | --- | --- |
| 5 | 0.39% | 12.92% | 41.0% |
| 6 | 2.312% | 38.60% | 86.75% |
| 7 | 2.515% | 39.82% | 90.79% |
| 8 | 2.46% | 40.23% | 89.13% |
| 9 | 2.437% | 39.54% | 91.03% |
| 10 | 2.31% | 38.16% | 88.0% |
| 11 | 2.244% | 36.91% | 88.33% |
| 12 | 1.961% | 33.29% | 84.89% |

The foregoing data should not be interpreted to mean that supported catalysts according to the invention that are not subjected to a heat treatment lack high specificity. In fact, selectivity for non-heat treated catalysts increased over time and was high following an initial break-in period. The heat treatment process appears to accelerate selectivity, perhaps also increasing it over time.

The supported reactive catalysts of this invention are also useful for reactions of oxygen and organic compounds to form oxidized chemical products (direct oxidation). A variety of chemical substrates can be oxidized to form useful products. A list of examples, not to be construed as limiting the scope of the invention, includes: (a) the direct oxidation of olefins to produce acids, such propylene oxidation to acrylic acid or ethylene oxidation to acetic acid; (b) direct epoxidation of olefins to form epoxides, for example propylene to propylene oxide or ethylene to ethylene oxide; (c) the oxidation of xylenes to phthalic acids or related compounds, for example p-xylene to terephthallic acid, o-xylene to phthalic anhydride, and m-xylene to isophthalic acid; (d) the oxidation of ethylene to vinyl acetate; (e) the oxidation of ethylene to acetaldehyde; and (f) the oxidation of isobutylene to methacrylic acid. The preferred choice of active component for these catalysts will depend on the specific application. For example, the preferred main active component for the conversion of olefins to carboxylic acids is palladium, while the preferred active component for the conversion of olefins to epoxides is silver.

The supported reactive catalysts of this invention are also useful for hydrogenation reactions. The catalyst is particularly advantageous in cases where selectivity is a critical factor, i.e., cases where the feedstock contains more than one reducible functional group, but only certain of these functional groups should be hydrogenated. A particular example, not meant to be limiting of the scope of the invention, is useful in illustrating the utility of the invention. In the selective hydrogenation of acetophenone to methyl benzyl alcohol, the catalyst should selectively hydrogenate the carbonyl group, while leaving the benzene ring of the acetophenone molecule unaffected. A preferred catalyst for this application will be based on a major active component of platinum, palladium, or ruthenium. On the catalytic particles based on this invention, the double bond of the carbonyl group can be readily adsorbed in alignment with the top row of surface atoms on the catalyst surface, thereby positioning this bond for attack by hydrogen from adjacent surface sites. However, the bulkier aromatic ring does not fit on the linear surface structure, and will not be readily hydrogenated.

The catalyst of this invention is also useful for other reductive reactions, including but not limited to ammonia synthesis, carbonylation, hydroformylation, oil and fat hardening, reductive alkylation, reductive amination, and hydrosilation.

The catalyst of this invention is also useful for reactions which liberate hydrogen from reactant molecules, including dehydrogenation and reforming. For catalytic reforming of petroleum fractions and other hydrocarbons to form aromatic compounds, the preferred active catalytic component is platinum or a combination of platinum and rhenium. For reforming of hydrocarbons to form syngas, useful catalytic components are noble metals such as palladium, platinum, iridium, gold, osmium, ruthenium, rhodium, rhenium, and combinations thereof. The same noble metals, either singly or in combination, are useful for dehydrogenation reactions such as the conversion of propane to propylene or ethane to ethylene.

The catalyst of this invention is also useful as the catalytic component in a fuel cell electrode for polymer electrolyte membrane fuel cells and direct methanol fuel cells. On both the anode and cathode of these fuels cells, a controlled coordination catalyst based on platinum as the major active component is useful.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An intermediate precursor composition for use in manufacturing a supported catalyst having a controlled coordination structure, comprising:
    a plurality of catalyst atoms comprising at least one member selected from the group comprising noble metals, rare earth metals, and transition metals, and optionally one or more non-metals; and
    a control agent comprising a plurality of complexing molecules selected from the group comprising polymers, oligomers, and organic compounds, each complexing molecule having a plurality of functional groups disposed along a backbone for complexing the catalyst atoms to the complexing molecules,
        at least about 50% of the complexing molecules being straight-chained molecules that include at least four functional groups per molecule, and at least a portion of the complexing molecules forming a catalyst complex between the catalyst atoms and the complexing molecules,
        wherein the catalyst complex, after being applied to a support, forms a supported reactive catalyst comprising a support and a plurality of reactive catalyst particles formed from the catalyst complex,
        wherein the complexing molecules and catalyst atoms interact in such a way that a preponderance of catalyst atoms on an upper surface of supported reactive catalyst particles formed from the catalyst complex will have a nearest neighbor coordination number of 2.

2. An intermediate precursor composition as defined in claim 1, wherein at least a portion of the catalyst atoms comprise at least one noble metal selected from the group comprising palladium, platinum, iridium, gold, osmium, ruthenium, rhodium, and rhenium.

3. An intermediate precursor composition as defined in claim 1, wherein at least a portion of the catalyst atoms comprise at least one transition metal.

4. An intermediate precursor composition as defined in claim 3, wherein the transition metal comprises at least one member selected from the group comprising chromium, manganese, iron, cobalt, nickel, copper, zirconium, tin, zinc, tungsten, titanium, molybdenum, and vanadium.

5. An intermediate precursor composition as defined in claim 1, wherein at least a portion of the catalyst atoms comprise at least one rare earth metal.

6. An intermediate precursor composition as defined in claim 5, wherein the rare earth metal comprises at least one member selected from the group comprising lanthanum and cerium.

7. An intermediate precursor composition as defined in claim 1, wherein a portion of the catalyst atoms comprise at least one non-metal.

8. An intermediate precursor composition as defined in claim 1, further comprising at least one of an alkali metal or alkaline earth metal.

9. An intermediate precursor composition as defined in claim 1, wherein at least a portion of the functional groups comprise a carbon atom bonded to at least one electron-rich atom that is more electronegative than the carbon atom and that is able to donate one or more electrons so as to form a bond or attraction with at least one of the catalyst atoms.

10. An intermediate precursor composition as defined in claim 9, wherein the electron-rich atom comprises at least one of oxygen or nitrogen.

11. An intermediate precursor composition as defined in claim 9, wherein the electron-rich atom has a negative charge and the catalyst atoms have a positive charge.

12. An intermediate precursor composition as defined in claim 1, wherein at least about 60% of the complexing molecules are straight-chained.

13. An intermediate precursor composition as defined in claim 1, wherein at least about 75% of the complexing molecules are straight-chained.

14. An intermediate precursor composition as defined in claim 1, wherein at least about 90% of the complexing molecules are straight-chained.

15. An intermediate precursor composition as defined in claim 1, wherein at least about 95% of the complexing molecules are straight-chained.

16. An intermediate precursor composition as defined in claim 1, wherein about 100% of the complexing molecules are straight-chained.

17. An intermediate precursor composition as defined in claim 1, further comprising a solvent or carrier into which the catalyst complex and any remaining catalyst atoms and control agent are mixed.

18. An intermediate precursor composition as defined in claim 17, wherein the solvent or carrier comprises water.

19. An intermediate precursor composition as defined in claim 17, wherein the solvent or carrier comprises at least one aqueous acid.

20. An intermediate precursor composition as defined in claim 17, wherein the solvent or carrier comprises at least one organic solvent.

21. An intermediate precursor composition as defined in claim 17, further comprising at least one support material.

22. An intermediate precursor composition as defined in claim 21, wherein the catalyst complex is impregnated within, but not chemically bonded to, the support material.

23. An intermediate precursor composition as defined in claim 21, wherein the catalyst complex is chemically bonded to the support material.

24. An intermediate precursor composition as defined in claim 1, further comprising at least one support material to which the catalyst complex is chemically bonded.

25. An intermediate precursor composition as defined in claim 1, wherein the control agent has a number average molecular weight in a range of about 300 to about 15,000 Daltons.

26. An intermediate precursor composition as defined in claim 1, wherein the control agent has a number average molecular weight in a range of about 600 to about 6,000 Daltons.

27. An intermediate precursor composition as defined in claim 1, wherein a substantial portion of the control agent includes from about 4 to about 200 of the functional groups per complexing molecule.

28. An intermediate precursor composition as defined in claim 1, wherein a substantial portion or the control agent includes from about 8 to about 80 functional groups per complexing molecule.

29. An intermediate precursor composition as defined in claim 1, wherein a substantial portion of the control agent includes from about 10 to about 20 functional groups per complexing molecule.

30. An intermediate precursor composition as defined in claim 1, wherein the intermediate precursor composition includes a molar ratio of control agent functional groups to catalyst atoms in a range of about 0.5:1 to about 40:1.

31. An intermediate precursor composition as defined in claim 1, wherein the intermediate precursor composition includes a molar ratio of control agent functional groups to catalyst atoms in a range of about 1:1 to about 35:1.

32. An intermediate precursor composition as defined in claim 1, wherein the intermediate precursor composition includes a molar ratio of control agent functional groups to catalyst atoms in a range of about 3:1 to about 30:1.

33. An intermediate precursor composition as defined in claim 1, wherein the control agent comprises at least one of polacrylic acid or a polyacrylic acid salt.

34. An intermediate precursor composition as defined in claim 1, wherein the control agent comprises at least one member selected from the group comprising polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, and polypropylene glycol.

35. An intermediate precursor composition as defined in claim 1, wherein the catalyst complex comprises a random distribution of at least two different types of catalyst atoms.

36. An intermediate precursor composition as defined in claim 35, wherein the catalyst complex forms a supported reactive catalyst in a manner so that reactive catalyst particles formed from the catalyst complex will also include a random distribution of at least two different types of catalyst atoms.

37. An intermediate precursor composition for use in manufacturing a supported catalyst having a controlled coordination structure, comprising:
   a plurality of catalyst atoms comprising at least one member selected from the group comprising noble metals, rare earth metals, and transition metals, and optionally one or more non-metals; and
   a control agent comprising a plurality of complexing molecules selected from the group comprising polymers and oligomers, each complexing molecule having a plurality of functional groups disposed along a backbone for complexing the catalyst atoms to the complexing molecules,
      at least about 50% of the complexing molecules being straight-chained and at least a portion of the complexing molecules forming a catalyst complex between the catalyst atoms and the complexing molecules,
      wherein the catalyst complex, after being applied to a support, forms a supported reactive catalyst comprising a support and a plurality of reactive catalyst particles formed from the catalyst complex,
      wherein the complexing molecules and catalyst atoms interact in such a way that a preponderance of catalyst atoms on an upper surface of supported reactive catalyst particles formed from the catalyst complex will have a nearest neighbor coordination number of 2.

38. An intermediate precursor composition as defined in claim 37, wherein at least about 75% of the complexing molecules are straight-chained.

39. An intermediate precursor composition as defined in claim 37, wherein at least about 90% of the complexing molecules are straight-chained.

40. An intermediate precursor composition as defined in claim 37, further comprising a solvent or carrier into which the catalyst complex and any remaining catalyst atoms and control agent are dissolved or dispersed.

41. An intermediate precursor composition as defined in claim 40, further comprising at least one support material.

42. An intermediate precursor composition as defined in claim 41, wherein the catalyst complex is impregnated within, but not chemically bonded to, the support material.

43. An intermediate precursor composition as defined in claim 41, wherein the catalyst complex is chemically bonded to the support material.

44. An intermediate precursor composition as defined in claim 37, further comprising at least one support material to which the catalyst complex is chemically bonded.

45. An intermediate precursor composition as defined in claim 37, wherein the control agent comprises at least one of polacrylic acid or a polyacrylic acid salt.

46. An intermediate precursor composition as defined in claim 37, wherein the control agent comprises at least one member selected from the group comprising polyvinylbenzoates, polyvinyl sulfate, polyvinyl sulfonates including sulfonated styrene, polybisphenol carbonates, polybenzimidizoles, polypyridine, sulfonated polyethylene terephthalate, polyvinyl alcohol, polyethylene glycol, and polypropylene glycol.

47. An intermediate precursor composition as defined in claim 37, wherein the catalyst complex comprises a random distribution of at least two different types of catalyst atoms.

48. An intermediate precursor composition as defined in claim 47, wherein the catalyst complex forms a supported reactive catalyst in a manner so that reactive catalyst particles formed from the catalyst complex will also include a random distribution of at least two different types of catalyst atoms.

49. A method of preparing an intermediate precursor composition for use in manufacturing a supported catalyst having a controlled coordination structure, the method comprising:

providing a plurality of catalyst atoms comprising at least member selected from the group comprising noble metals, rare earth metals, and transition metals, and optionally one or more non-metals;

providing a control agent comprising a plurality of complexing molecules selected from the group comprising polymers, oligomers, and organic compounds, each complexing molecule having a plurality of functional groups disposed along a backbone for complexing the reactive catalyst atoms to the complexing molecules, wherein at least about 50% of the complexing molecules are straight-chained molecules that include at least four of the functional groups per molecule;

mixing together the catalyst atoms and control agent in a liquid to form a mixture; and reacting at least a portion of the catalyst atoms with at least a portion of the control agent to yield a catalyst complex that, after being applied to a support, forms a supported reactive catalyst comprising a support and a plurality of reactive catalyst particles formed from the catalyst complex, wherein the complexing molecules and catalyst atoms interact in such a way that a preponderance of catalyst atoms on an upper surface of supported reactive catalyst particles formed from the catalyst complex will have a nearest neighbor coordination number of 2.

50. A method of preparing an intermediate precursor composition as defined in claim 49, further comprising contacting the catalyst complex with a support.

51. A method of preparing an intermediate precursor composition as defined in claim 50, wherein the catalyst complex is impregnated within, but not bonded to, the support.

52. A method of preparing an intermediate precursor composition as defined in claim 50, further comprising reacting the catalyst complex with the support so that a portion of the control agent chemically bonds the catalyst complex to the support.

53. A method of preparing an intermediate precursor composition as defined in claim 52, wherein the portion of the control agent that bonds the catalyst complex to the support does so by means of a condensation reaction.

54. A method of preparing an intermediate precursor composition as defined in claim 52, wherein the portion of the control agent that bonds the catalyst complex to the support comprises an anchoring agent.

55. A method of preparing an intermediate precursor composition as defined in claim 52, further comprising removing the liquid so as to yield a supported catalyst precursor composition comprising the catalyst complex bonded to the support.

56. A method of preparing an intermediate precursor composition as defined in claim 49, wherein the catalyst complex includes a random distribution of at least two different types of catalyst atoms.

57. A method of preparing an intermediate precursor composition for use in manufacturing a supported catalyst having a controlled coordination structure, the method comprising:

providing a plurality of catalyst atoms comprising at least member selected from the group comprising noble metals, rare earth metals, and transition metals, and optionally one or more non-metals;

providing a control agent comprising a plurality of complexing molecules selected from the group comprising polymers and oligomers, each control agent molecule having a plurality of functional groups disposed along a backbone for complexing the reactive catalyst atoms to the complexing molecules, wherein at least about 50% of the complexing molecules arc straight-chained;

mixing together the catalyst atoms and control agent in a liquid to form a mixture; and reacting at least a portion of the catalyst atoms with at least a portion of the control agent to yield a catalyst complex that, when applied to a support, forms a supported reactive catalyst comprising a support and a plurality of reactive catalyst particles formed from the catalyst complex, wherein the complexing molecules and catalyst atoms interact in such a way that a preponderance of catalyst atoms on an upper surface of supported reactive catalyst particles formed from the catalyst complex will have a nearest neighbor coordination number of 2.

58. A method of preparing an intermediate precursor composition as defined in claim 57, further comprising contacting the catalyst complex with a support.

59. A method of preparing an intermediate precursor composition as defined in claim 58, wherein the catalyst complex is impregnated within, but not bonded to, the support.

60. A method of preparing an intermediate precursor composition as defined in claim 58, further comprising reacting the catalyst complex with the support so that a portion of the control agent chemically bonds the catalyst complex to the support.

61. A method of preparing an intermediate precursor composition as defined in claim 60, wherein the portion of the control agent that bonds the catalyst complex to the support does so by means of a condensation reaction.

62. A method or preparing an intermediate precursor composition as defined in claim 60, wherein the portion of the control agent that bonds the catalyst complex to the support comprises an anchoring agent.

63. A method of preparing an intermediate precursor composition as defined in claim 60, further comprising removing the liquid so as to yield a supported catalyst precursor composition comprising the catalyst complex bonded to the support.

64. A method of preparing an intermediate precursor composition as defined in claim 57, wherein the catalyst complex includes a random distribution of at least two different types of catalyst atoms.

* * * * *

UNITED STATES PATENT AND TRADEMARK OFFICE
CERTIFICATE OF CORRECTION

| | |
|---|---|
| PATENT NO. | : 7,045,479 B2 |
| APPLICATION NO. | : 10/618909 |
| DATED | : May 16, 2006 |
| INVENTOR(S) | : Zhou et al. |

It is certified that error appears in the above-identified patent and that said Letters Patent is hereby corrected as shown below:

Column 5
Line 6, change "group" to --groups--

Column 16
Line 61, change "precisedly" to --precisely--

Column 17
Line 11, after "within" remove [,]

Column 19
Line 8, after "example" insert --,--
Line 32, after "example" insert --,--

Column 20
Line 49, after "follows" change "." to --:--

Column 24
Line 49, after "while" remove [,]

Column 27
Line 33, change "de-ionized" to --deionized--

Column 28
Line 41, after "example" insert --,--

Column 34
Line 48, change "or" to --of--

UNITED STATES PATENT AND TRADEMARK OFFICE
CERTIFICATE OF CORRECTION

| | | |
|---|---|---|
| PATENT NO. | : 7,045,479 B2 | Page 2 of 3 |
| APPLICATION NO. | : 10/618909 | |
| DATED | : May 16, 2006 | |
| INVENTOR(S) | : Zhou et al. | |

It is certified that error appears in the above-identified patent and that said Letters Patent is hereby corrected as shown below:

<u>Drawings</u> Delete Figure 1A and Replace with figure below.
Sheet 1, replace Figure 1A with the figure depicted herein below, wherein "FCC (101) Face" has been changed to --FCC (110) Face--

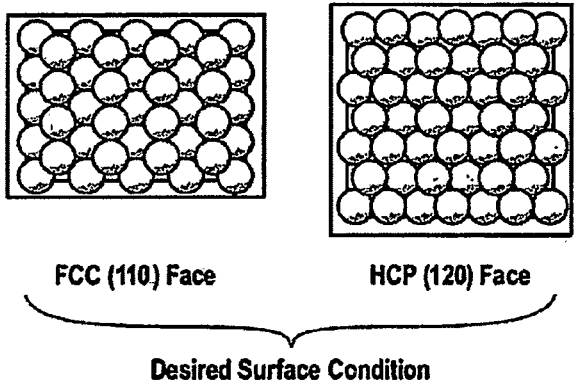

*Fig. 1A*

UNITED STATES PATENT AND TRADEMARK OFFICE
CERTIFICATE OF CORRECTION

PATENT NO. : 7,045,479 B2
APPLICATION NO. : 10/618909
DATED : May 16, 2006
INVENTOR(S) : Zhou et al.

It is certified that error appears in the above-identified patent and that said Letters Patent is hereby corrected as shown below:

Drawings Delete figure 2A, and replace with figure below.
Sheet 2, replace Figure 2A with the figure depicted herein below, wherein "FCC (101) Face" has been changed to --FCC (110) Face--

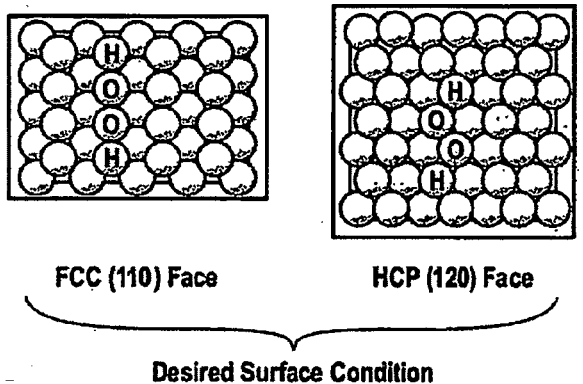

Fig. 2A

Signed and Sealed this

Twenty-eighth Day of November, 2006

JON W. DUDAS
*Director of the United States Patent and Trademark Office*